US008928480B2

(12) United States Patent
Iffergan

(10) Patent No.: US 8,928,480 B2
(45) Date of Patent: Jan. 6, 2015

(54) REINFORCED MARINE OPTIC FIBER SECURITY FENCE

(76) Inventor: David Iffergan, Sugarland, TX (US)

( * ) Notice: Subject to any disclaimer, the term of this patent is extended or adjusted under 35 U.S.C. 154(b) by 761 days.

(21) Appl. No.: 12/987,793

(22) Filed: Jan. 10, 2011

(65) Prior Publication Data

US 2011/0227753 A1    Sep. 22, 2011

Related U.S. Application Data

(63) Continuation-in-part of application No. 12/727,436, filed on Mar. 19, 2010, now Pat. No. 8,537,011.

(51) Int. Cl.
*G08B 13/00*    (2006.01)
(52) U.S. Cl.
USPC ............ 340/541; 340/555; 340/6.1; 340/850; 340/501
(58) Field of Classification Search
None
See application file for complete search history.

(56) References Cited

U.S. PATENT DOCUMENTS

| | | | |
|---|---|---|---|
| 2,391,059 A | 12/1945 | Mcfarren | |
| 3,187,793 A | 6/1965 | Quase | |
| 3,984,987 A | 10/1976 | Light, Jr. | |
| 4,146,346 A | 3/1979 | Salo | |
| 4,230,395 A * | 10/1980 | Dean et al. | 385/109 |
| 4,300,857 A | 11/1981 | Santamaria | |
| 4,365,239 A | 12/1982 | Mongeon | |
| 4,371,869 A | 2/1983 | Davidson | |
| 4,399,430 A | 8/1983 | Kitchen | |
| 4,450,434 A | 5/1984 | Nielsen et al. | |
| 4,484,836 A | 11/1984 | Ballard | |
| 4,558,308 A | 12/1985 | Ciordinik et al. | |
| 4,688,024 A | 8/1987 | Gadde | |
| 4,738,563 A | 4/1988 | Clark | |
| 4,815,815 A | 3/1989 | Mori | |
| 4,829,286 A | 5/1989 | Zvi | |
| 5,154,537 A | 10/1992 | DeVries et al. | |

(Continued)

FOREIGN PATENT DOCUMENTS

| | | |
|---|---|---|
| GB | 2 038 060 | 7/1980 |
| GB | 2052092 A | 1/1981 |

(Continued)

OTHER PUBLICATIONS

Examination Report in corresponding application GB 1104659.6, dated Apr. 16, 2013.

(Continued)

*Primary Examiner* — Nabil Syed
*Assistant Examiner* — Brian Wilson
(74) *Attorney, Agent, or Firm* — Thomas, Karceski & Karmilovich, PC

(57) ABSTRACT

A fence for establishing a secure marine perimeter includes an optic fiber net. The optic fiber net includes an optic fiber wire with an input end and an output end. A light transmitter connects to the input end to introduce an input optic signal into the optic fiber wire. A light receiver connects to the output end to receive an output optic signal from the optic fiber wire. A strength member is incorporated into the optic fiber wire to strengthen the optic fiber net. A processor is connected to the light receiver to generate an output signal based on the output optic signal. The processor compares the output optic signal with the input optic signal and generates an alarm if a difference between the input optic signal and the output optic signal exceeds a predetermined alarm threshold.

16 Claims, 24 Drawing Sheets

(56) References Cited

U.S. PATENT DOCUMENTS

| | | |
|---|---|---|
| 5,530,430 A | 6/1996 | Pavlov |
| 6,681,709 B1 | 1/2004 | Nixon et al. |
| 6,843,197 B1 | 1/2005 | Nixon et al. |
| 6,980,108 B1 | 12/2005 | Gebbia et al. |
| H2148 H | 3/2006 | Mastro et al. |
| 7,068,166 B2 | 6/2006 | Shibata et al. |
| 7,110,625 B2 | 9/2006 | Chun |
| 7,123,785 B2 * | 10/2006 | Iffergan ................... 385/13 |
| 7,134,807 B2 | 11/2006 | Dreyer |
| 7,135,970 B2 | 11/2006 | Kowal et al. |
| 7,140,599 B1 | 11/2006 | Spink |
| 7,173,690 B2 | 2/2007 | Haran |
| 7,184,907 B2 | 2/2007 | Chun |
| 7,233,544 B1 | 6/2007 | McDonald |
| 7,245,810 B2 | 7/2007 | Iffergan |
| 7,339,474 B2 | 3/2008 | Easley et al. |
| 7,385,506 B2 | 6/2008 | Shibata et al. |
| 7,402,790 B2 | 7/2008 | Browning, Jr. et al. |
| 7,419,140 B2 | 9/2008 | Perry |
| 7,488,929 B2 | 2/2009 | Townley-Smith et al. |
| 7,590,322 B2 | 9/2009 | Puzan et al. |
| 7,637,224 B1 | 12/2009 | Portmann et al. |
| 2005/0225277 A1 | 10/2005 | Savard et al. |
| 2006/0083458 A1 | 4/2006 | Iffergan |
| 2006/0216116 A1 | 9/2006 | Baker et al. |
| 2008/0285924 A1 * | 11/2008 | Graveston et al. ............ 385/102 |
| 2008/0298899 A1 | 12/2008 | Glessner et al. |
| 2009/0035068 A1 | 2/2009 | Terai et al. |
| 2011/0227731 A1 | 9/2011 | Iffergan |

FOREIGN PATENT DOCUMENTS

| | | |
|---|---|---|
| GB | 2258553 A | 2/1993 |
| JP | 3-053400 | 3/1991 |
| NL | 1021754 C2 | 4/2004 |

OTHER PUBLICATIONS

Search and Examination Report in corresponding appiication GB 1104660A, Apr. 20, 2011.

Search and Examination Report in corresponding application GB 1104659.6, Jul. 15, 2011.

* cited by examiner

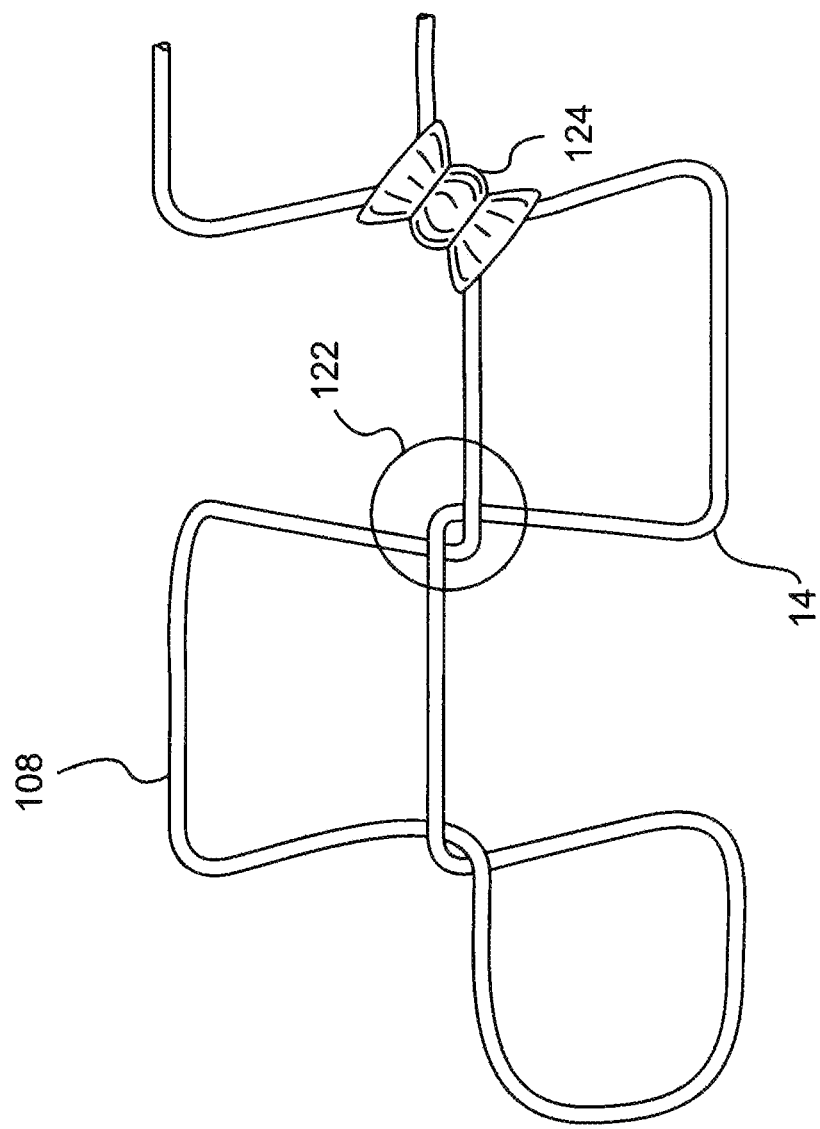

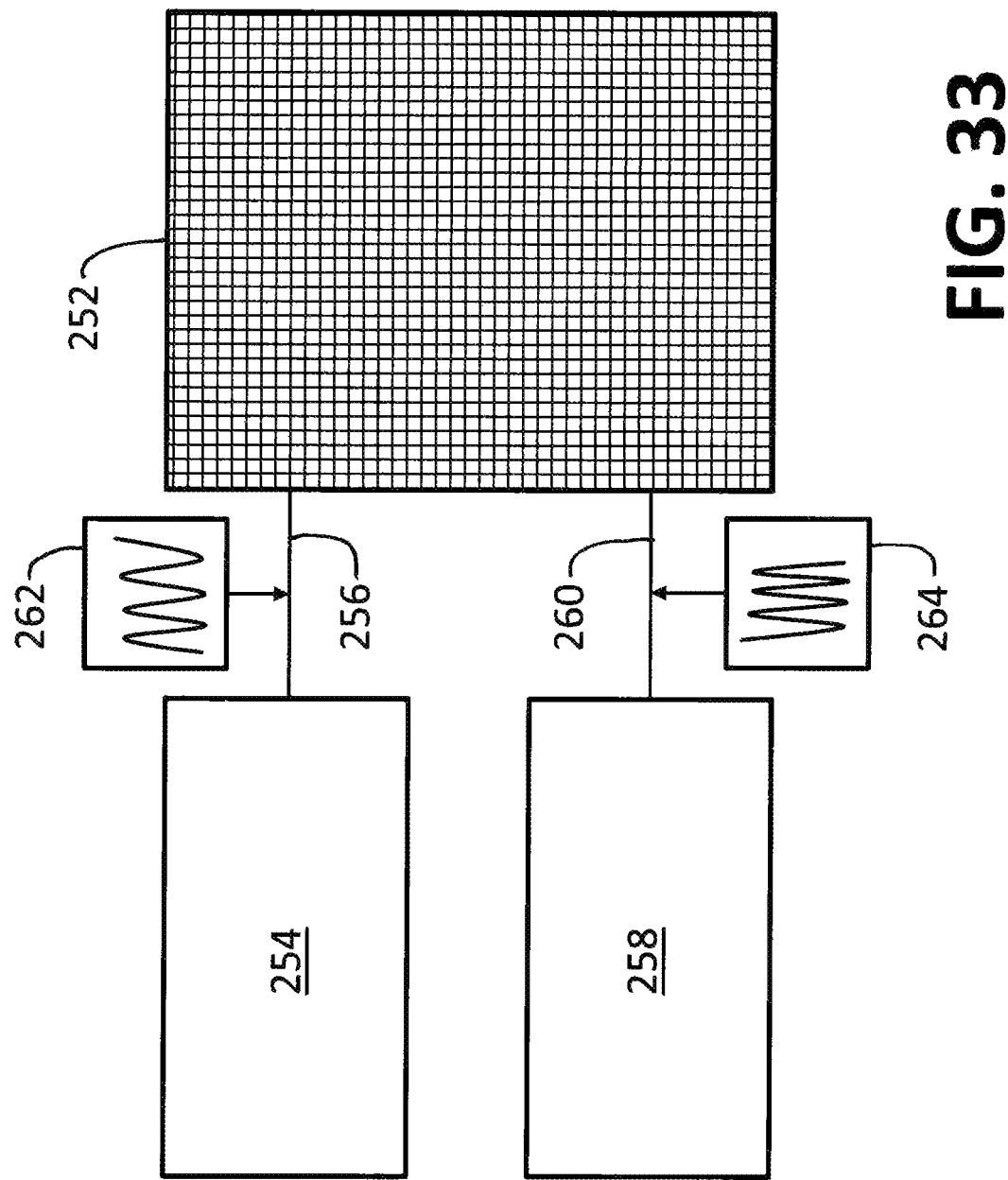

REINFORCED MARINE OPTIC FIBER SECURITY FENCE

CROSS-REFERENCE TO RELATED PATENT APPLICATION(S)

The is a Continuation-In-Part of U.S. patent application Ser. No. 12/727,436, filed on Mar. 19, 2010 now U.S. Pat. No. 8,537,011, the contents of which are incorporated herein by reference.

FIELD OF THE INVENTION

The present invention is directed to an optic fiber security fence that may be employed in a marine environment. More specifically, the present invention concerns a security fence that extends both above and below the surface of a body of water to detect intrusions and/or attempted intrusions therethrough. While the security fence is reinforced for additional structural resistance in marine environments, it may be employed in non-marine environments as well.

BACKGROUND OF THE INVENTION

Security of physical localities has always been, and continues to be, a matter of concern for various entities, governmental and private alike.

While there are numerous systems and apparatuses that have been developed to secure land-based installations, systems and apparatuses that may be employed or deployed in marine (i.e., water) environments are less prevalent, primarily due to the difficulties associated with the placement and maintenance of such systems in marine environments.

As detailed below, many marine security apparatuses and systems employ sonar (or equivalent detection systems) to determine if an intruder is approaching or has entered a secure marine perimeter.

While sonar is effective in detecting the approach or entry of intruders into a secure marine perimeter, there are limitations to sonar. Specifically, with respect to small-sized intruders, sonar has detection limitations. This may become a concern if the intruder is a diver or some type of robotic submersible.

There has developed, therefore, a desire for those seeking to secure a marine perimeter for systems that provide reliable intruder detection. In particular, there has developed a desire for perimeter barriers that provide a physical barrier while also providing a capability for automated detection of intrusions and attempted intrusions.

Before providing a summary of the present invention, a summary of some prior art devices is provided below.

U.S. Statutory Invention Registration No. H 2148 describes an underwater net protection system. The system includes a flexible netting 14, extending upwardly from underwater anchor locations 16, that defines an underwater protective zone 10. Penetration attempts, such as a hole 20 in the flexible netting 14, are monitored by a system 18. The bottom portion 19 of the netting 14 is made from a substantially heavier material than the rest of the netting 14 so as to resist or prevent lifting thereof. The netting is made from elongated netting elements 26 that are cross-fastened to one another. The elongated netting elements 26 include a tubular portion 28 that encases the optical fiber signal line 30 and a reinforcement member 29 that extends in parallel with the optic fiber signal line 30. An attempt to cut (or an actual cut through) the netting 14 is detected by the penetration detection system 18. As illustrated in FIG. 1, it appears that the netting 14 is suspended from a ship to protect a dock 12.

U.S. Pat. No. 7,233,544 describes a harbor fence that is used to establish a security perimeter around a ship or other vessel, for example. The harbor fence system 103 includes a number of spars 105, 107, 109 that are connected to one another at the waterline by a cable containing multiple wires and at the top by a thinner top line with at least one wire. The shape of the harbor fence 103 is maintained by moors 111, which includes a floating platform 151 that is anchored by anchors 153, 155. The spar 109 includes an upper section 161, a retractable keel 163, and a counterweight 165. The upper section 161 may include sensors to detect whether the harbor fence 103 is being impacted. The system may also detect a cut in the top line. Alternatively, the harbor fence system 103 may interact with an underwater sonar system 1300 that can detect underwater intruders that attempt to dive beneath the harbor fence system 103.

U.S. Pat. No. 6,681,709 describes a port security barrier system 10 that is designed to stop hostile, high speed, waterborne craft 12 that attempt to enter the area secured by the barrier system 10. The security barrier 10 is made up of several modules 14, each of which is about 50 feet (15.24 m) in length. A mooring system 15 includes mooring buoys 16, mooring lines 18, and mooring anchors 20. When assembled, the barrier 10 provides a continuous, floating wall for the port facility that extends from 1 to 8 feet (30.48 to 243.84 cm) above the water. The barrier system 10 appears to be designed specifically for threats on the water's surface.

U.S. Pat. No. 7,140,599 describes a coupling system and method for marine barriers. Specifically, this patent describes a barrier system that includes a coupler that permits adjacent sections of the barrier system to be stored (in a non-deployed state) in a side-by-side fashion. With respect to FIG. 31, for example, the system includes barrier segments 880 with float pipes 882, net posts 884, and a net system 886. The barrier system 880 also includes a raft module 890 such that a predetermined load may be supported on the platform 894. The barrier system 880 creates a barrier line to prevent ingress of watercraft into a protected zone surrounded by the barrier system 880. The barrier system 880 appears to be directed to threats on the surface of a body of water.

U.S. Pat. No. 7,123,785 is directed to an optic fiber security fence system that includes an optical fiber net woven from an optical fiber wire. A light generator introduces an incident light signal into the optical fiber wire. A light receiver receives an exigent light signal from the optical fiber wire. An optical sensor wire also is provided. The optical sensor wire is connected to the optical fiber wire and is displaced when a force is applied to the optical fiber net. The optical sensor wire receives a patterned incident light signal that is altered upon application of a force to the optical fiber net, thereby producing an altered patterned exigent light signal. The light receiver initiates an alarm either (1) if the exigent light signal from the optical fiber wire terminates, or (2) after comparing the exigent patterned light signal with the incident patterned light signal in the optical sensor wire and establishing a deviation, if the deviation exceeds a predetermined threshold.

U.S. Pat. No. 7,245,810 describes a fiber optic cable fastener that joins fiber optic cable. The fastener includes a first segment having a plurality of grooves to accommodate portions of the fiber optic cables. Raised contoured portions are configured to damage the fiber optic cables if an intruder tampers with the fastener.

U.S. Pat. No. 4,399,430 describes an intruder detection security system including a security fence 2 made from a plurality of elongated members 4, 6, 8, 10, 12, and 14. The elongated members are optical fibers surrounded by or coated with polyvinyl chloride ("PVC"). FIG. 9 of the '430 patent illustrates the cross-section of one of the elongated members, showing the optical fiber 1 loosely housed within a PVC tube 5 reinforced with Kevlar® strength members 3. (Kevlar® is a trademark of the Dupont Company referring to a para-aramid fiber manufactured by that company. According to the information provided by the DuPont Company through its website, http://www.dupont.com/kevlar/whatiskevlar.html, Kevlar® fibers consist of long molecular chains produced from poly-paraphenylene terephthalamide.) The elongated members 4, 6, 8, 10, 12, 14 form a mesh between two upright posts 16, 18. In one embodiment, at each joining point 20 of the elongated members 8, 10, 12, 14, the elongated members 8, 10, 12, 14 are joined together by a steel ferrule 36. The optical fibers 4, 6, 8, 10, 12, 14 are connected between an output control box 22 and an input control box 24. If the amplitude of the signals received by the output control box 22 fall outside a predetermined range, an output signal is transmitted to operate an alarm 34.

U.S. Pat. No. 4,371,869 describes a fence or wall incorporating a fiber-optic wave guide. The security system described in the '869 patent includes a composite strip 1 of bendable material, which is referred to as a carrier strip 2. The carrier strip 2 may be made of steel, for example. A single fiber-optic filament 3 extends within a groove running along the face of the carrier strip 2. The carrier strip 2 probably is coated with a corrosion-resistant layer in the form of a sheathing 4, for example. A light source or laser generator 6 directs light into one end of the fiber-optic filament 3 and a detector 7 receives the light signal at the other end. The detector 7 is connected to a warning device 8. The warning device 8 is activated if a change in the intensity of light exiting the fiber-optic filament 3 falls outside of a predetermined range.

U.S. Pat. No. 4,450,434 describes an apparatus for determining a break in locations in fencing. As described, a cable 4 is strung along a fence 2 and is attached to the fence 2 via support means 6 for is attached to the fence by being interwoven therein). The cable 4 is made of an optical fiber with an electrical transmission line running therealong. In the embodiment illustrated in FIG. 2, the cable 4 is made of two optical fibers 8, 10, which are coated with metalized coatings 12, 14. The coated fibers are separated from one another by the insulating material 16 in which they are embedded. The cable 4 is connected to an LED or laser transmitter 30 at one end and a light receiver 32 at the other end. One end of the transmission line is connected to a pulse generator 34 and a pulse receiver 36. The other end is open-circuited. The optical portion of the cable 4 carries the light signal such that a break in the light signal is detected by the level detector 40, triggering operation of an alarm means 42. The output of the level detector 40 is connected to the input of the electrical pulse generator 34, which generates an electrical pulse that is reflected to the pulse receiver 36. The time delay between the initiation and receipt of the electrical pulse permits the system to establish the location of the break.

U.S. Pat. No. 4,558,308 describes an intrusion warning wire-lattice that comprises a number of single fence sections 1 mounted between box-type posts 2. Each fence section 1 includes solid wires (shown in dashed lines) and a serpentine coil 4 made of a hollow wire (shown in solid lines). The tubular wires encapsulate an electrical or optical conductor 8 that is connected to an alarm system, which is responsive to a break or deformation of the electrical or optical conductor 8.

U.S. Pat. No. 4,829,286 describes a security fence system made up of a taut wire fence made of taut wires 10 strung in a parallel orientation between an anchoring post 12 and a sensor post 14. An optical fiber 17 is threaded serially through a plurality of adjacent sensor posts and is coupled to a signal transceiver 18. A taut wire connection element 34 is connected to the sensor post 14 and to two adjacent taut wires 36. The connection element 34 rotatably connects to the sensor post 14. An optical fiber engagement member 38 connects to the rod 30 so that is also rotates on the sensor post 14. The taut wire connection element 34 and the optical fiber engagement member 38 are connected to one another such that, if the taut wire connection element 34 and the optical fiber engagement member 38 rotate with respect to one another over a long period of time, the optical fiber 42 is not disturbed. As a result, no alarm sounds. However, if the taut wire connection element 34 is rotated rapidly, the optical fiber engagement member 38 also rotates, displacing the optical fiber 42, thereby triggering an alarm.

U.S. Pat. No. 5,530,430 describes a vibration responsive barbed tape security system. The security system is made up of multiple sections of fence barrier 1 that surround an area. The barrier includes a chain link fence 2 and a secondary barrier 4 in the form of a spiral barbed tape. A tube 24 is in contact with each loop of the spiral barbed tape. The tube 24 contains a vibration sensitive fiber optic cable 30 that transmits light in a predictable manner. Any movement or vibration of the tube vibrates the fiber optic cable, triggering an alarm.

UK Patent Application No. GB 2 038 060 describes an intruder alarm that gives an alarm when an intrusion has occurred into a protected area and also gives an alarm when an attempt to breach a protected area is in progress. The intruder alarm includes a network of optical fiber light conductors forming or included in a fence. Light is fed into the ones of the light conductors such that penetration or attempted penetration of the light conductors triggers an alarm.

According to the English translation, Japanese Patent No, JP 3053400 describes a trespasser monitor method that detects whether a trespasser exists and the position of the trespasser by detecting the position of the reflection of an optical pulse from a disconnection point.

Other fence systems that employ an optic fiber sensor include, but are not limited to, U.S. Pat. Nos. 7,488,929, 7,419,140, 7,402,790, 7,385,506, 7,184,907, 7,173,690, 7,135,970, 7,110,625, 7,068,166, and 6,980,108. These fence systems appear to involve only land-based secure perimeters.

U.S. Pat. No. 4,365,239 describes an intrusion warning system for protecting a wall or a fence, in particular a chain link fence, against intrusion (via cutting) or by climbing over same. The system combines a shielded cable 2 with a chain link fence 1. The fence 1 is intended to extend around the perimeter of an area to be protected. The length of the shielded cable 2 may be as long as 1,000 feet (304.8 m) in the described example. The shielded cable 2 is an electrical coaxial cable with an inner conductor surrounded by an outer, shielded conductor with a layer of insulating dielectric material therebetween. In operation, a signal is sent through the coaxial cable. An attempt to break through the fence disrupts the electrical signal, triggering an alarm.

Reference also is made to U.S. Pat. No. 7,339,474, which describes a deflection sensing system that relies on taught, electrified, metal wires to detect an instruction or attempted intrusion.

Concerning optical fibers, reference is made to U.S. Pat. No. 7,590,322, which describes a fiber optic cable with enhanced saltwater performance. The fiber optic cable 100 has a configuration tailored or optimized to inhibit water penetration and water migration down the cable 100. The cable 100 includes water-swellable tape 135 and water-swellable yarn 120 to block migration of fresh water and/or saltwater along the cable 100. The cable includes a jacket 115, a buffer tube 150, and corrugated metal armor 175. Optical fibers 105 are positioned within the water-swellable yarn 120.

It has been found that certain marine environments present enhanced technical challenges when employing an optic fiber security fence in a marine environment. Accordingly, it has been noted that a more robust optic fiber net may present improved security characteristics in a marine environment.

As made apparent by the above-identified prior art, physical security systems fix marine environments that provide automated intrusion detection are not prevalent in the prior art.

SUMMARY OF THE INVENTION

The present invention provides a physical security barrier system that includes automated detection of intrusions and/or attempted intrusions.

In one contemplated embodiment, the fence includes a platform constructed to float on a surface of a body of water, the platform defining a top surface. At least two uprights extend above the top surface of the platform to a predetermined height. An optic fiber net, with a top end and a bottom end is disposed adjacent to the uprights and extends from a first predetermined point above the surface of the body of water to a second predetermined point below the surface of the body of water. The optic fiber net includes at least one optic fiber wire, the optic fiber wire having an input end and an output end. A light transmitter is connected to the input end to introduce an input optic signal into the optic fiber wire. A light receiver is connected to the output end to receive an output optic signal from the optic fiber wire. A processor is connected at least to the light receiver to generate an output signal based at least on the output optic signal, to compare the output optic signal with the input optic signal, and to generate an alarm if a difference between the input optic signal and the output optic signal exceeds a predetermined alarm threshold.

The present invention also contemplates that the inclusion of at least one anchor that engages a bottom of the body of water. One or more anchor fines may extend from the anchor to the platform to secure the platform in a predetermined location on the surface of the body of water.

In one embodiment, the anchor may be a concrete block.

It is contemplated that the platform may include a floating body to maintain the platform on the surface of the body of water.

The platform may include a deck disposed atop the floating body. The deck may be made from wood, artificial wood, plywood, metal, and a composite.

An intermediate layer may be disposed between the floating body and the deck.

A first securing line may be disposed between the uprights, with the top end of the optic fiber net being connected to the first securing line.

It is contemplated that a second securing line may be connected a predetermined distance above the bottom end of the optic fiber net. The second securing time may be affixed to the bottom of the body of water and retain the bottom end of the optic fiber net against the bottom of the body of water.

In one embodiment, the first securing line may be threaded through holes near the top of the uprights and is maintained in a taut condition to support the optic fiber net.

It is contemplated that the anchor line may include an elastic section that includes at least one elastic member and a section constructed from a steel cable, a natural rope, synthetic rope, wire, and/or composite materials.

Where in elastic section is employed, the elastic section may incorporate a coil spring and/or an elastic band.

In contemplated embodiments, the optic fiber wire may include an optic fiber, a first jacket cladding the optic fiber, strength fibers surrounding the first jacket, and a second jacket surrounding the strength fibers.

In one variation, the optic fiber may include a plurality of optic fibers.

In another embodiment, the strength fibers may include a water-swellable material.

It is contemplated that the one optic fiber wire may include a plurality of optic fibers, a first jacket cladding each of the plurality of optic fibers, strength fibers surrounding the first jackets of the plurality of optic fibers, and a second jacket surrounding the strength fibers and the plurality of optic fibers.

In contemplated embodiments of the invention, the light transmitter is anticipated to generate one of coherent light and/or patterned light. The processor generates an alarm if the output optic signal is not received by the light receiver and/or the patterned light deviates beyond a predetermined threshold.

The optic fiber net may be made from a plurality of panels that are connected to one another to form the optic fiber net.

In another contemplated embodiment of the invention, the fence may include at least two uprights extending from a bottom of a body of water to a distance above the surface of the body of water, an optic fiber net having a top end and a bottom end, the optic fiber net being disposed adjacent to the uprights and extending from a first predetermined point above the surface of the body of water to a second predetermined point below the surface of the body of water. The optic fiber net may include at least one optic fiber wire, the optic fiber wire having an input end and an output end. A light transmitter may be connected to the input end to introduce an input optic signal into the optic fiber wire. A light receiver may be connected to the output end to receive an output optic signal from the optic fiber wire. A processor may be connected at least to the light receiver to generate an output signal based at least on the output optic signal, to compare the output optic signal with the input optic signal, and to generate an alarm if a difference between the input optic signal and the output optic signal exceeds a predetermined alarm threshold.

In still another contemplated embodiment of the present invention, the fence may include at least one buoy and an optic fiber net being connected to the at least one buoy at an intermediate point between a first end and a second end, the first and second ends being disposed on the bottom of a body of water, the at least one buoy defining a region beneath the optic fiber net for surrounding a submerged object.

In one contemplated embodiment of the present invention, a fiber optic net is provided with a fiber optic cable that includes reinforcing members made from a corrosion-resistant material, wherein the reinforcing members provide enhanced resistance to environmental conditions, particularly those experienced in marine environments.

It is contemplated, for example, that the optic fiber net incorporate one or more metal wires or tape wrapped around the optic fiber to enhance the structural composition of the optic fiber net.

One embodiment contemplates that the metal wires may be stainless steel, corrosion-resistant steel, titanium, copper, aluminum, and alloys thereof, among others.

Another embodiment contemplates the addition of non-metallic strength fibers or tape such as carbon fiber, aramid fibers, nylon, polyimides, polyester (and other polymers), and the like.

An embodiment of the invention provides a fence for establishing a secure marine perimeter that includes an optic fiber net. The optic fiber net includes at least one optic fiber wire, where the optic fiber wire having an input end and an output end. A light transmitter connects to the input end to introduce an input optic signal into the optic fiber wire. A light receiver connects to the output end to receive an output optic signal from the optic fiber wire. At least one strength member is incorporated into the optic fiber wire to strengthen the optic fiber net. A processor is connected at least to the light receiver to generate an output signal based at least on the output optic signal, to compare the output optic signal with the input optic signal, and to generate an alarm if a difference between the input optic signal and the output optic signal exceeds a predetermined alarm threshold.

In one contemplated embodiment, the strength member is a single wire.

In another contemplated embodiment, the strength member is a cable with several wires stranded together.

In still one further embodiment, the strength member is band-shaped, having a rectangular cross-section. The strength member may be a metallic or a non-metallic tape.

Further aspects of the invention will become apparent from the discussion that follows.

BRIEF DESCRIPTION OF THE DRAWINGS

The drawings appended hereto are intended to assist in the discussion of the invention and are not intended to be limiting of the invention. Where appropriate, like reference numerals refer to like structures and components, in which:

FIG. 8 is an illustration of a portion of the optic fiber net illustrated in FIG. 5, showing one alternative construction where fasteners are added to the optic fiber net;

FIG. 33 is a schematic illustration of at least a portion of a system that provides an electrical signal to strength members incorporated into the optical fiber net of the present invention.

Other aspects of the present invention should be appreciated from the drawings appended hereto.

DESCRIPTION OF PREFERRED EMBODIMENT(S) OF THE INVENTION

Figure 1:
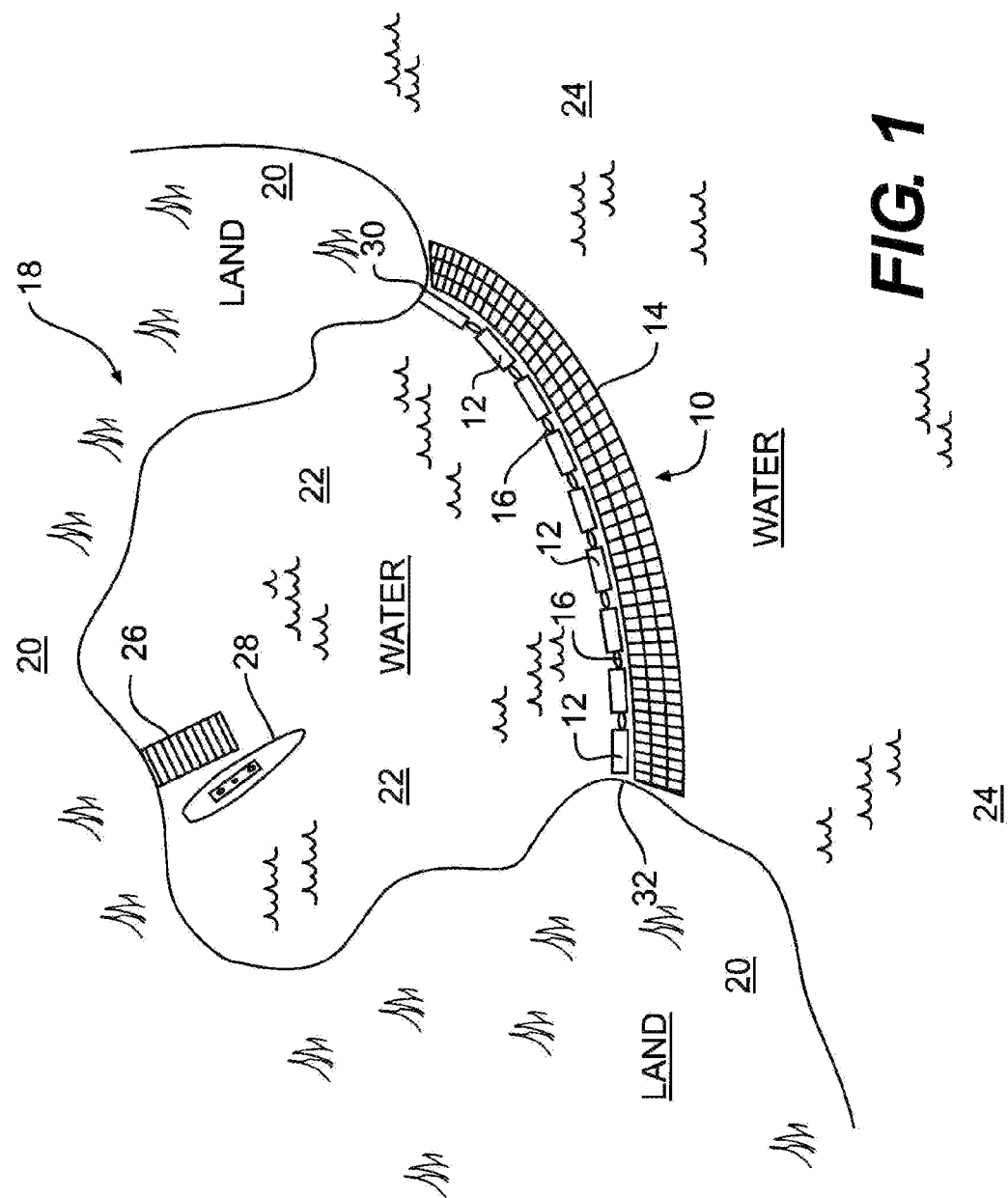
FIG. 1 is an aerial representation of the placement of the marine barrier system of the present invention, as might be employed in one typical marine environment such as a harbor.

The marine barrier system of the present invention is intended for use in marine environments, such as in a harbor setting, as illustrated in FIG. 1. While specific embodiments of the invention will be described herein, the embodiments are meant to be illustrative only and are not meant to be limiting of the scope of the invention. To the contrary, those skilled in the art will appreciate variations and equivalents of the marine barrier system. Those variations and equivalents are intended to be encompassed by the present invention, even if not explicitly described herein.

With reference to FIG. 1, one contemplated embodiment of the marine barrier system 10 of the present invention includes a plurality of floating platforms 12 and an optic fiber net 14. The floating platforms 12 are connected to one another, via connectors 16. The details of the connectors 16 are not discussed herein because they are not the focus of the present invention. As should be appreciated by those skilled in the art, there are numerous different types of connectors 16 that may be employed without departing from the scope of the present invention. The present invention is not intended to be limited by the use of any particular connector 16.

As illustrated in FIG. 1, the marine barrier system 10 is intended to be deployed in a marine environment. To assist with an understanding of one exemplary deployment of the marine barrier system 10, FIG. 1 shows a harbor 18 that includes a C-shaped land mass 20 surrounding a body of water 22. The body of water 22 opens into a larger body of water, such as a sea or ocean 24, for example. For purposes of illustration, the body of water 22 includes a dock 26 with a ship 28 adjacent thereto.

As shown in FIG. 1, the marine barrier system 10 extends from a first shore point 30 to a second shore point 32. The marine barrier system 10 is contemplated to operate as a single, unitary body that extends between such shore points 30, 32. However, the marine barrier system 10 may be employed as a circle that encircles a particular security zone. This might occur, for example, if a secure perimeter needs to be set up around a ship 28 that is not at a dock 26. One variation of this contemplated embodiment is discussed in connection with FIG. 16.

While the marine barrier system 10 is contemplated to create a unitary security perimeter, it is contemplated that the marine barrier system 10 may be employed in sections that are physically separated from one another. A segmented deployment may be needed in areas, for example, that present natural, underwater barriers (e.g., coral reefs), which would otherwise discourage deployment of the marine barrier system 10 at a specific location, Still other variations are intended to be encompassed by the present invention.

The marine barrier system 10 of the present invention also is intended to establish a permanent, semi-permanent, or mobile security perimeter. Specifically, the weight and modularity of the marine barrier system 10 of the present invention, as discussed in greater detail herein, provides significant flexibility with respect to deployment of the system.

In a permanent installation, the marine barrier system 10 may be connected to permanent structures, such as shore locations 30, 32, or to man-made barriers such as sea walls. The marine barrier system 10, however, is adaptable so that it may be employed in circumstances where a temporary security perimeter needs to be established. Due to reliance on the optic fiber net 14, it is also contemplated that the marine barrier system 10 of the present invention may be employed to establish a mobile security perimeter. In other words, the marine barrier system 10 may be deployed around a moving vessel, if desired or required. In such a deployment, the marine barrier system 10 may be moved together with the vessel or other type of floating installation.

Figure 2:
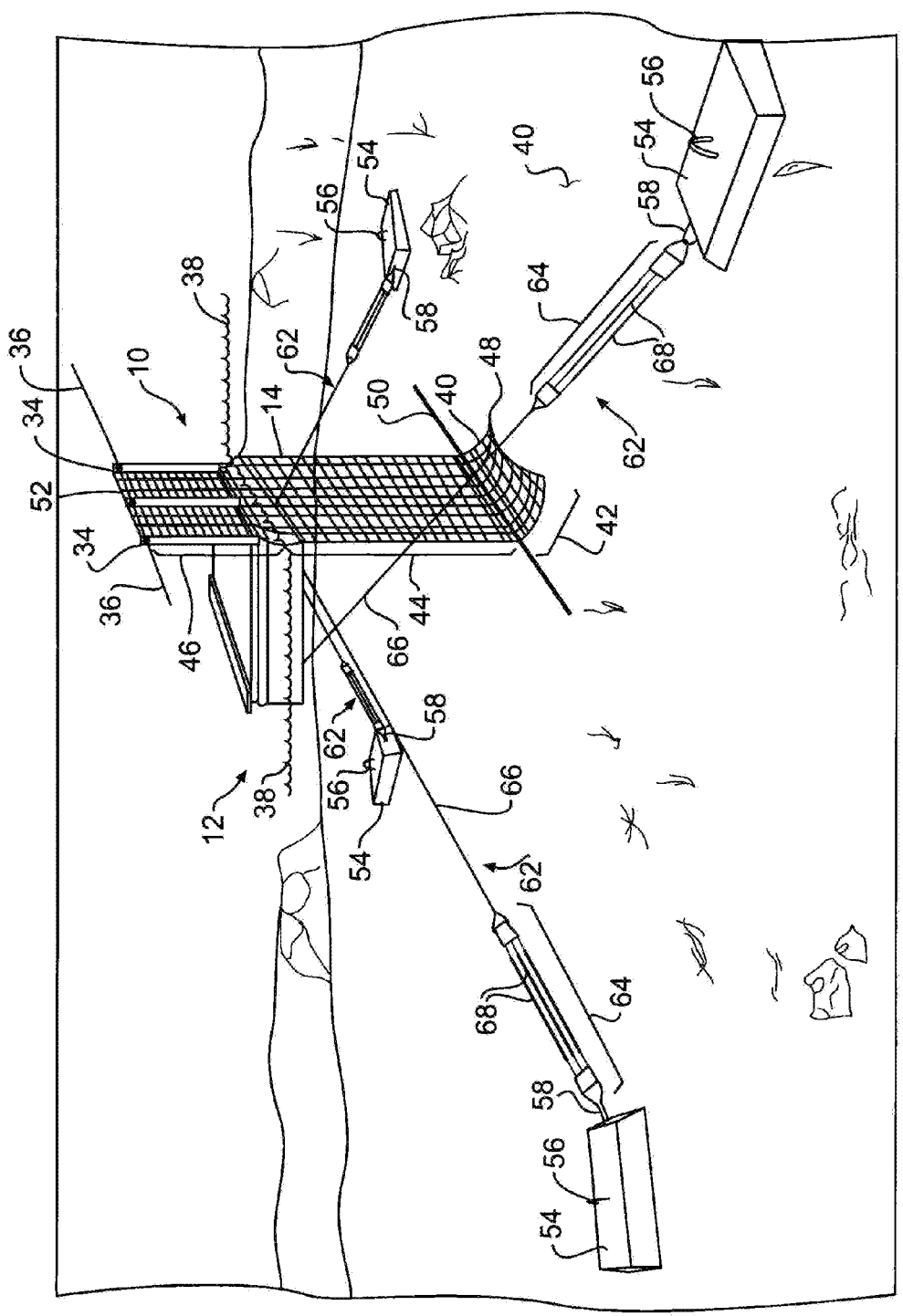
FIG. 2 is a perspective illustration of a portion of the marine barrier system of the present invention, as it might be deployed in one typical marine environment.

FIG. 2 provides a perspective illustration of the marine barrier system 10 of the present invention. Specifically, FIG. 2 shows a portion of one floating platform 12 and a segment of the optic fiber net 14 suspended therefrom.

The floating platform 12 includes a plurality of vertical uprights 34 with a cable 36 extending across the uprights 34. The optic fiber net 14 is suspended from the cable 36, in the embodiment that is illustrated. As shown in FIG. 2, the optic fiber net 14 extends from the cable 36, which is positioned a predetermined distance above the surface 38 of the water, to the sea floor 40.

As may be appreciated from the embodiment illustrated in FIG. 2, the optic fiber net 14 defines at least three distinct regions: a lower region 42, a middle region 44, and an upper region 46. The lower region 42 extends from a bottom end 48 of the optic fiber net 14 to a location where a chain 50 is connected to the optic fiber net 14. The middle region 44 extends from the location of the chain 50 to the waterline 38 that defines the surface of the water. The upper region 46 extends from the waterline 38 to the cable 36. It is noted that the conventions of the lower region 42, the middle region 44, and the upper region 46 are provided for purposes of discussing the invention and should not be considered to be limiting of the present invention.

The cable 36 may be any suitable type of cable or flexible line that extends between the uprights 34. The cable 36 may connect individual uprights 34 to one another. Alternatively, the cable simply may extend through holes in a plurality of uprights 34. The exact disposition of the cable 36 may vary depending upon the particular needs to secure a particular marine perimeter.

In the embodiment illustrated in FIG. 2, the cable 36 is a stainless steel cable. Stainless steel is a suitable material for the cable 36, as it is resistant to oxidation, which is particularly problematic in marine environments. The cable 36 is contemplated to be formed from a plurality of individual wires that are braided together. While a braided stainless steel cable is contemplated for the cable 36, the present invention is not limited to this embodiment. For example, the cable 36 may be a unitary wire made from a metal, plastic, or a composite material. Alternatively, the cable 36 may be a rope, made from natural or man-made materials. The exact composition and construction of the cable 36 is not critical to the operation of the present invention.

With regard to the uprights 34, no particular material is contemplated to be necessary for operation of the marine barrier system 10 of the present invention. It is anticipated that the uprights 34 will be made from a stainless steel so that the uprights are resistant to corrosion, as is to be expected from the marine environment. However, other materials may be employed. For example, the uprights 34 may be made from aluminum, plastic, wood, or other suitable material. It is contemplated that the material for the uprights 34 may be selected so that the uprights 34 do not add unnecessarily to the overall weight of the floating platform 12 to which the uprights 34 are attached. Moreover, since the uprights 34 are connected to one side of the floating platform 12, the weight of the uprights 34 should not be so great as to unbalance the weight of the floating platform 12. Naturally, if the uprights 34 are sufficiently heavy that they tend to cause the floating platform 12 to tilt, the platform 12 may be weighted to compensate for this tilt.

Together, the uprights 34 and the cable 36 cooperate create a frame to which the top end 52 of the optic fiber net 14 is connected. Specifically, it is envisioned that the cable 36 will be threaded through various ones of the loops of the optic fiber not 14 so that the optic fiber net 14 "hangs" from the cable 36.

As may be appreciated, the optic fiber net 14 need not be suspended from the cable 36. It is contemplated that the optic fiber net may be attached directly to the uprights and/or other structures on the platform 12. The exact manner in which the optic fiber net 14 is connected to the platform 12 is not critical to operation of the marine barrier system 10 of the present invention.

As also illustrated in FIG. 2, the marine barrier system 10 of the present invention includes at least one anchor 54 that is constructed to engage the sea floor 40. For definitional purposes, it is noted that the term "sea floor" is intended to refer generically to the bottom of a body of water. As a result, the terms "sea floor" and "bottom of a body of water" are meant to be interchangeable and refer to the substrate that underlies the body of water. As may be appreciated, the sea floor 40 may be a naturally-occurring feature or may be man made In FIG. 2, four anchors 54 are illustrated. However, as should be appreciated by those skilled in the art, a larger number or a fewer number of anchors 54 may be employed, depending upon the local marine conditions. It is contemplated, for example, that in areas with rougher seas, a larger number of anchors 54 will be needed. In calmer bodies of water, it is suspected that only one anchor 54 may be needed.

In FIG. 2, the anchors 54 are illustrated as concrete blocks, which are lowered into place via placement eyelets 56 that are embedded in the concrete. It should be understood that, while concrete anchors 54 are envisioned for one embodiment of the invention, concrete blocks are not the only type of anchors 54 that may be employed successfully. It is contemplated that different anchors 54 may be used as dictated by the local conditions where the marine security system 10 is deployed. For example, something akin to a traditional ship's anchor may be used, if appropriate for the environment. Alternatively, the platform 12 may be tied directly to an existing underwater structure. For example, it may be prudent to affix placement eyelets 56 to one or more rock outcroppings to secure the platform 12.

Figure 3:
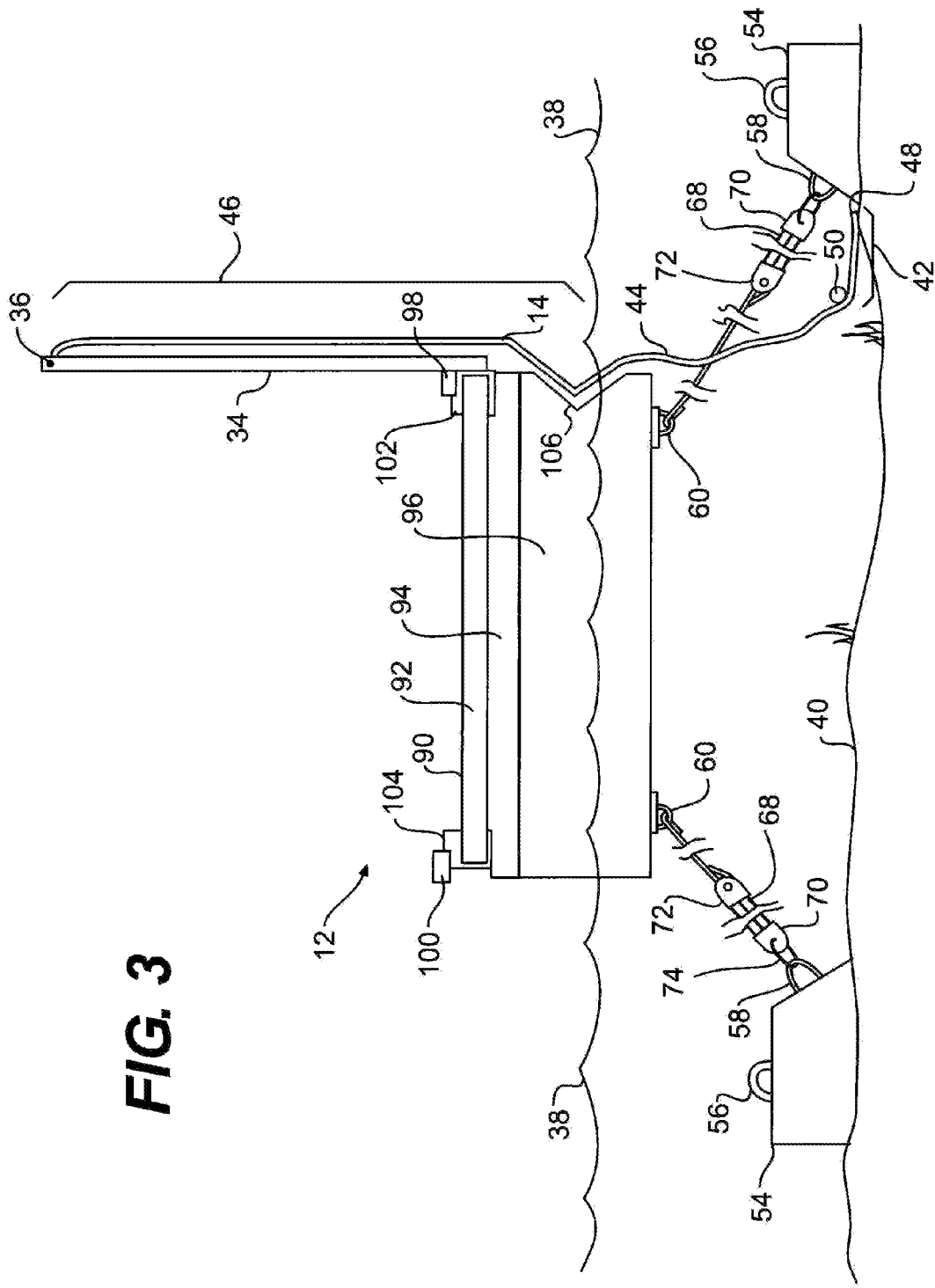
FIG. 3 is a side view of a portion of the marine barrier system of the present invention.

In the embodiment illustrated in FIG. 2, each anchor 54 includes an anchor line eyelet 58. With reference to FIG. 3, the bottom surface of the floating platform 12 also includes a plurality of anchor line eyelets 60. An anchor line 62 extends between the first anchor line eyelet 58 and the second anchor line eyelet 60. While a single anchor line 62 is contemplated to extend between each anchor 54 and its associated platform 12, it is contemplated that more than one anchor line 62 may be connected to each anchor 54. In addition, the anchors 54 need not be dedicated to an individual platform 12. Instead, a single anchor 54 may be connected to multiple platforms 12, as should be apparent to those skilled in the art.

As illustrated in FIGS. 2 and 3, the anchor lines 62 are not simply cables that are connected to the first and second eyelets 58, 60. While simple cables or lines may be employed, the present invention contemplates a responsive anchor line 62. A simple cable includes, but is not limited to a steel cable, rope, or chain that extends between the first and second eyelets 58, 60.

With reference to FIGS. 2 and 3, the anchor line 62 contemplated for use with the marine barrier system 10 of the present invention includes at least an elastic section 64 and an cable section 66. The elastic section 64 includes one or more elastic members 68 that permit the anchor line 62 to stretch. The reason for this is simple. Waves cause the floating platform 12 to rise and fall. The elastic section 64 of the anchor line 62 permits the floating platform 12 to rise and fall with wave action. The elastic section 64 also permits the floating platform 12 to move in response to rising and falling tides, which also are a concern in a marine environment.

Before discussing the elastic section 64 of the anchor line 62, it is noted that the cable section 66 of the anchor line 62 is contemplated include a steel cable or wire. Alternatively, the cable section 66 may comprise rope made from natural or man-made fibers. Still other materials are contemplated for the cable section 66.

The elastic section 64 of the anchor line 62 includes first and second brackets 70, 72. The first bracket 70 is attached to the anchor line eyelet 58. In the illustrated embodiment, a ring 74 connects the first bracket 70 to the anchor line eyelet 58. While this embodiment is illustrated, the ring 74 is not required: the first bracket 70 may be attached directly to the anchor line eyelet 58 or to the anchor 54. Still other embodiments are contemplated. For example, the first bracket 70 may be connected to the anchor 54 via a cable, wire, rope, or other type of connector. The second bracket 72 is connected to the cable section 66 of the anchor line 62. In the illustrated embodiment, the second bracket 72 connects directly to the cable section 66 of the anchor line. In other contemplated embodiments, the second bracket 72 may be connected via any suitable type of connector, as should be appreciated by those skilled in the art.

The elastic members 68 are coiled springs in the illustrated embodiment. However, reliance on coiled springs is not required for the present invention. Any material or configuration may be employed for the elastic members 68, as should be appreciated by those skilled in the art. For example, the elastic members 68 could be rubber cords (or other type of elastic material) that extend between the first and second brackets 70, 72. Other embodiments also are envisioned for the elastic members 68.

Figure 4:
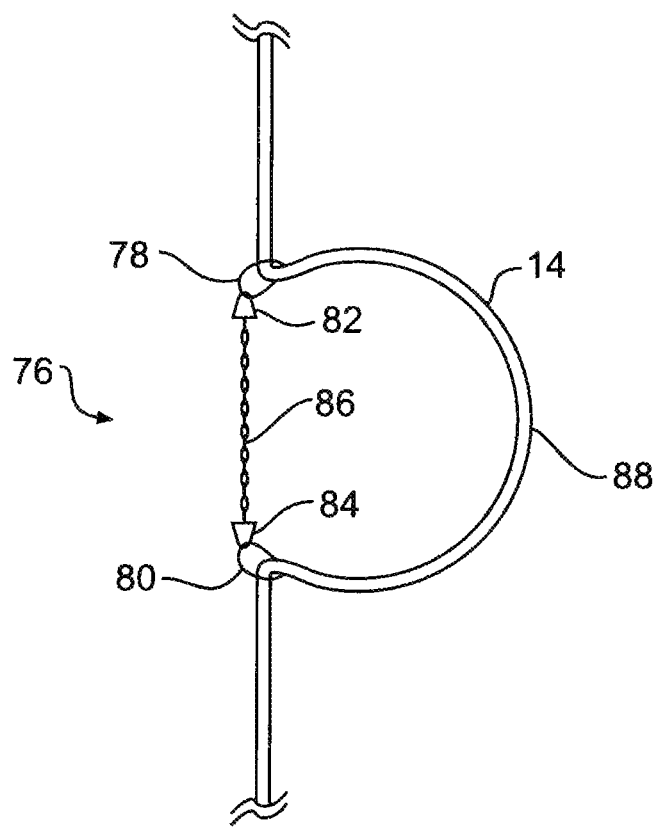
FIG. 4 is a side view illustration of an alternative embodiment of the optic fiber net of the present invention, showing a portion of the optic fiber net including an elastic fold therein.

Before continuing with a discussion of the construction of the floating platform 12 and its associated peripherals, reference is made to FIG. 4. FIG. 4 provides an enlarged side view of a portion of the optic fiber net 14. In this embodiment, the optic fiber net 14 includes an elastic member 76, which is akin to the elastic member 68 on the anchor line 62. The elastic member 76 connects to the optic fiber net 14 via first and second rings 78, 80. The rings 78, 80 are, in turn, connected to brackets 82, 84. At least one elastic member 86 extends between the brackets 82, 84.

As illustrated in FIG. 4, the elastic member 76 is disposed on the optic fiber net 14 in such a fashion as to create a fold 88 in the optic fiber net 14. Therefore, the elastic member 76 establishes a portion of the optic fiber net 14 that may expand when a wave lifts the floating platform 12 or when the depth of the body of water changes, for example, during changing tides, As should be apparent, a plurality of elastic members 76 may be employed in a side-by-side fashion to establish a continuous fold 88 from one side of the optic fiber net 14 to the other. In addition, several folds 88 may be established from the top to the bottom of the optic fiber net 14.

As noted above, the optic fiber net 14 is intended to be held against the sea floor 40 by a chain 50. While a steel chain is envisioned for this purpose, other structures may be employed for the chain 50, as should be appreciated by those skilled in the art. For example, the chain 50 may be a wire, cable, or rope. It is envisioned that the chain 50 will be anchored to the sea floor 40 at one or more locations. The chain 50 may be anchored via anchors 54 or via alternative structures.

In an alternative embodiment, it is contemplated that the chain 50 may be affixed to the optic fiber net 14 but not connected to the sea floor 40. In this embodiment, the chain 50 merely acts as a weight at the bottom of the optic fiber net 40. As may be appreciated, this alternative embodiment presents a construction that is considered to be less secure, since it is possible that an intruder may be able to lift and swim under the optic fiber net 14.

In the illustrated embodiment, the chain 50 is intended to hold the optic fiber net 14 against the sea floor 40 so that an intruder cannot swim under the bottom end 48 of the optic fiber net 14. To provide additional security, it is envisioned that the lower region 42 of the optic fiber net 14 will extend a predetermined distance beyond the chain 50. The lower region 42 of the optic fiber net 14 is expected to lie directly on the sea floor 40. If an intruder were to try to swim under the optic fiber net 14, the lower region 42 provides an additional segment that the intruder would have to avoid before entering the secure perimeter. It is unlikely that an intruder could lift the lower portion of the optic fiber net and swim under the chain 50 without triggering an alarm, as detailed below.

In one contemplated embodiment of the marine barrier system 10, the lower region of the optic fiber net 14 is about 10 feet (3,048 m). It is anticipated that this length of optic fiber net 14 should be sufficient to detect any attempted intrusion under the net 14. Of course, a longer or shorter lower region 42 may be employed for the present invention. It is anticipated, however, that a length of between 5 feet (about 1.5 m) and 15 feet (about 4.5 m) should ensure adequate security.

Since the optic fiber net 14 is secured to the sea floor 40, the optic fiber net 14 typically will need to be deployed so that there is a sufficient length of additional optic fiber net 14 to accommodate vertical motion of the floating platform 12 with respect to the sea floor 40. To accommodate this movement (either by action of the waves or the tides), it is contemplated that the optic fiber net 14 may include the elastic elements 76 as illustrated in FIG. 4. It is also envisioned that a sufficient length of fiber optic net may be provided for the middle region 44 of the optic fiber net 14 to accommodate the maximum amount of change in the depth of the body of water. This additional length that is added to the middle region 44 would then rest on the sea floor in low tide but be stretched more tightly in high tide.

Renewed reference is now made to FIGS. 2 and 3. As shown, the floating platform 12 includes a top surface 90 defined by a top platform layer 92. The top platform layer 92 is positioned atop a middle platform layer 94. In turn, the middle platform layer 94 is positioned on a lower platform layer 96.

The top platform layer 92 is contemplated to be made from a suitable material on which a person can walk. Wood decking material or plywood may be used for the top platform layer 92, for example. Other materials may be used in the alternative. For example, plastic planks or metal plating may be used to construct the top platform layer 92, as should be appreciated by those skilled in the art.

The middle platform layer 94 may be made from any suitable type of rigid substrate to support the top platform layer 92. The middle platform layer 94 may be a plastic layer, for example. It is contemplated that the middle platform layer 94 will be desirable in instances where the top platform layer 92 is made from a material such as plywood to provide additional structural support for a person walking on the top surface 90 of the floating platform.

The bottom platform layer 96 is contemplated to be made from a suitable floatation material such as a closed-cell foam or equivalent. Alternatively, the bottom platform layer 96 may be a hollow structure, such as a rectangular plastic buoy. In still one other contemplated embodiment, the bottom platform layer may be constructed from a plurality of pontoons that are connected to one another, much like a raft. Other materials and/or constructions may be employed for the bottom platform layer 96 so that the floating platform 12 remains at the surface 38 of the body of water.

It is noted that the top and middle platform layers 92, 94 are not required to practice the present invention. It is contemplated that the top, middle, and bottom layers 92, 94, 96 may be made as a single, unitary structure, depending upon the materials employed.

In the embodiment illustrated in FIGS. 2 and 3, the floating platform 12 is provided with a front edge 98 and a rear edge 100, which are connected to the top platform layer 92 via edge members 102, 104. The edges 98, 100 are provided, among other reasons, to provide easily identified demarcations for the front and rear edges of the floating platform 12. The edges 98, 100 may be painted so that personnel walking on the top surface 90 may easily identify the edges 98, 100. This may be particularly helpful in low lighting conditions, such as at night, for example. As should be apparent, the front and rear edges 98, 100 are not required to practice the present invention.

In FIG. 3, it is noted that the front edge of the floating platform 12 includes a V-shaped groove 106. The V-shaped groove 106 is provided so that sharp edges are not presented to the optic fiber net. With such a construction, it is contemplated that there is a smaller likelihood that the floating platform 12 might damage the optic fiber net 14, thereby triggering an alarm.

Figure 5:
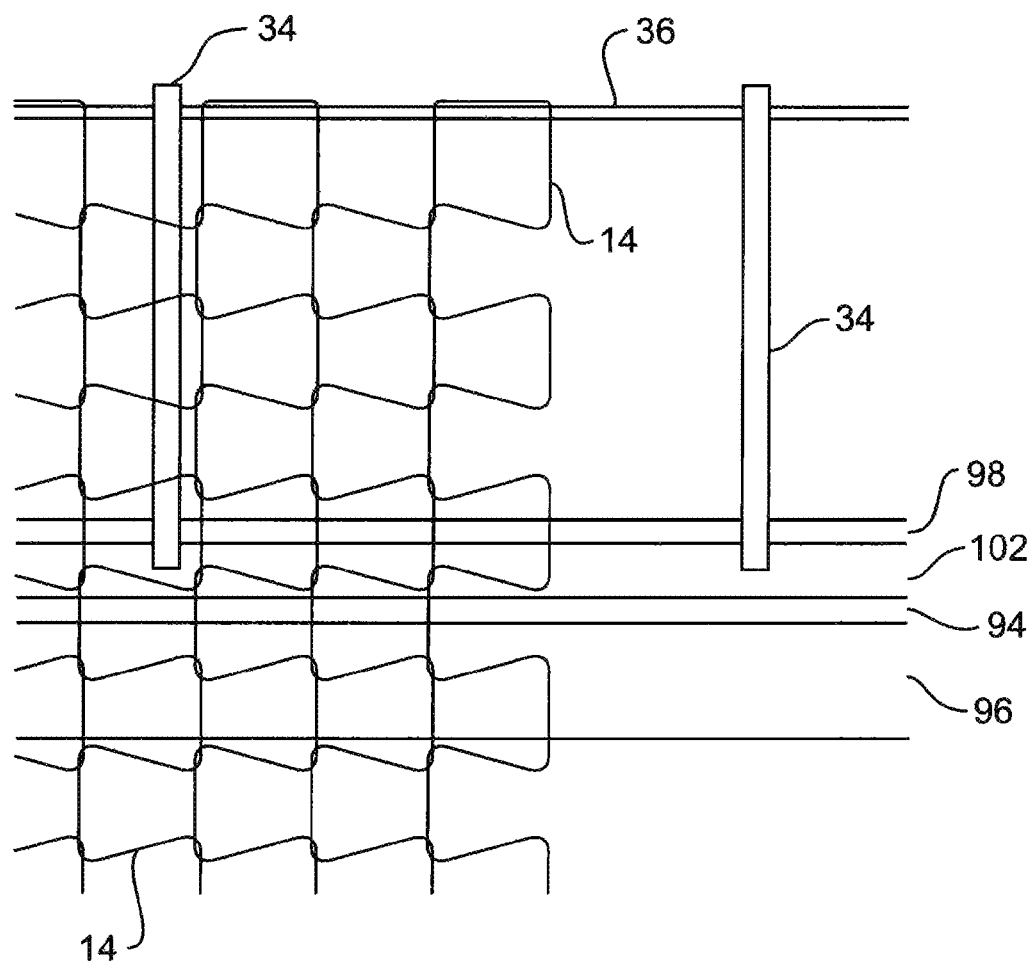
FIG. 5 is a front view of a portion of the marine barrier system of the present invention, showing the fiber optic net disposed over at least a portion of a floating platform.

FIG. 5 is a front view of the floating platform 12. The left hand side of the floating platform 12 is provided with a portion of the optic fiber net 14. Since illustration of the optic fiber net 14 complicates the illustration, it is shown on only a portion of the platform. As should be apparent from the foregoing, however, the optic fiber net 14 is intended to extend from one end of the floating platform 12 to the other.

As discussed above, and as illustrated in FIG. 6, the marine security system 10 of the present invention is includes an optic fiber net 14. The optic fiber net 14 is constructed from a single optic fiber wire 108 that is woven in a pattern such that the single optic fiber wire 108 forms the fiber optic net 14. In other words, the optic fiber net 14 contains only one, continuous optic fiber wire 108. This is not to say that the continuous optic fiber wire 108 may not be made up of several individual optic fiber wires 108 connected end to end via a suitable connection, as should be appreciated by those skilled in the art. Moreover, the optic fiber wire 108 may comprise several optic fiber wires that are bundled together.

While the marine security system 10 is contemplated to include only one optic fiber wire 108, it is contemplated that the marine security system 10 may include multiple (i.e., two or more) optic fiber wires 108 stranded together. Such a construction offers advantages that the single optic fiber wire 108 does not. For example, the optic fiber net 14 may be made stronger when two or more optic fiber wires 108 are stranded together. Alternatively, with the stranded approach, if one optic fiber wire 108 breaks, the marine security system 10 may be switched (manually or automatically) to the remaining optic fiber wire(s) 108 without the immediate need to replace or repair the damaged optic fiber wire 108. Moreover, additional optic fiber wires 108 may be relied upon to provide redundancy in the marine security system 10. If one of the optic fiber wires 108 breaks, the marine security system 10 may automatically switch its operation to rely on one or more of the optic fiber wires 108 to determine if there is a breach of more than one optic fiber wire 108, which may increase the accuracy of the marine security system 10 and reduce the occurrence of false alarms. In addition, the marine security system 10 may be designed to cycle periodically between the multiple optic fiber wires 108 for added security. Other advantages of the stranded approach will be apparent to those skilled in the art.

Regardless of the specific construction of the optic fiber wire 108, the optic fiber net 14 is contemplated to be fabric that contains at least one continuous, unbroken optic fiber wire 108.

Figure 7:
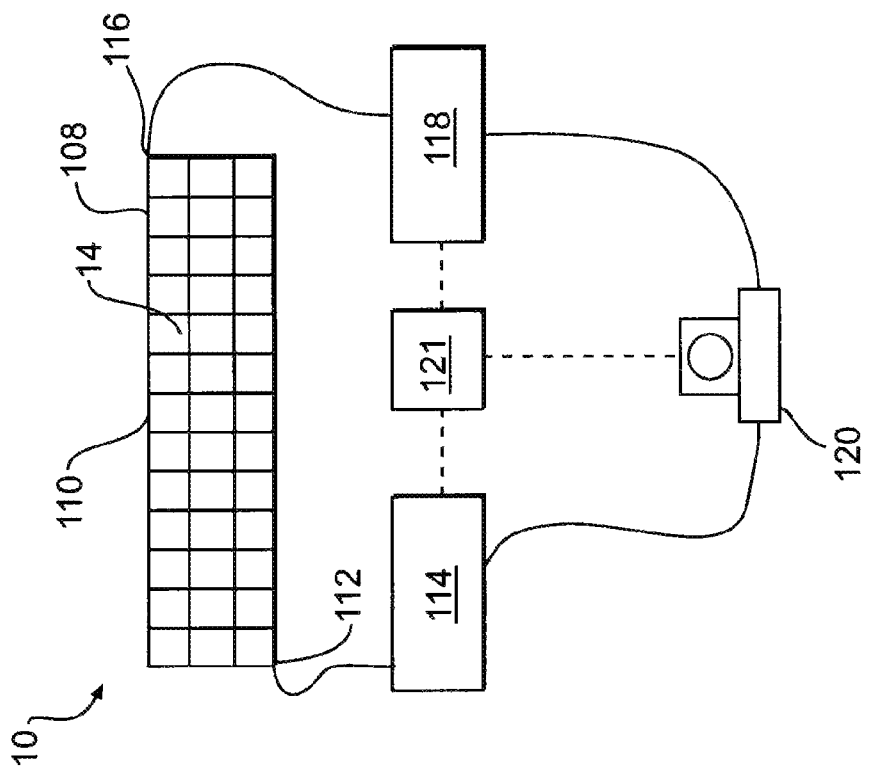
FIG. 7 is a schematic illustration showing the basic components of one embodiment of the marine barrier system of the present invention, including a representation of a single optic fiber panel.

Alternatively, the optic fiber wire 108 may be woven into a plurality of individual panels 110 that may be connected (preferably optically) to one another to form a continuous fiber optic screen from one end of the optic fiber net 14 to the other. A representation of a single optic fiber panel 110 is illustrated in FIG. 7.

It is contemplated that the optic fiber net 14 may be made from a plurality of panels 110 that are connected to one another in series. Alternatively, the marine security system 10 of the present invention may have a plurality of individual panels 110 that are operated independently from one another. In other words, the individual panels 110 need not be serially connected to one another for operation of the marine security system 10 of the present invention.

Manufacturing the optic fiber net 14 from a series of individual panels offers 110 at least one advantage over a construction where the optic fiber net 14 is a single, continuous fabric. In particular, where individual panels 110 are used, should one of the panels 110 become damaged or broken as the result of an intrusion (or a natural event), the damaged panel 110 may be easily removed so that a replacement panel 110 may be integrated into the marine security system 10. Other advantages of this construction will be apparent to those skilled in the art.

For purposes of the discussion herein, the term "panel" (as used with panel 110) should not be construed to be a panel 110 with any specific height or width dimensions.

It is noted that, where individual panels 110 are employed, the panels 110 may be connected to one another via fasteners so that, when connected, the panels 110 form the optic fiber net 14.

The optic fiber net 14 may be constructed to have any suitable dimensions adequate to be deployed as the marine security barrier 10. Since each installation will present different dimensional challenges, the marine barrier system 10 is intended to be adaptable to the various types and sizes of installations that may be encountered. Moreover, the construction of the marine barrier system 10 is intended to be flexible so that it may be adapted to the marine environment where it is installed.

Because the marine security system 10 of the present invention includes an optic fiber net 14, the marine security system 10 is immune to electromagnetic interference (such as from lightning, for example). Moreover, the marine security system 10 is immune to radio frequencies, electrostatic fields, and radiation, among other types of interference(s) that may be considered to diminish the systems ability to function in its intended manner.

The optic fiber wire 108 is contemplated to include a single optic fiber that is clad in a suitable protective coating. The protective coating may be one or more layers of polyvinyl chloride and/or other materials, including aramid fibers such as Kevlar®, that provide adequate strength for the optic fiber wire 108. The construction of the optic fiber wire 108 should permit the wire 108 to flex, Flexibility of the optic fiber wire 108 is understood to extend the operational lifetime of the marine barrier system 10, since it is expected that the optic fiber wire 108 will be subjected to repetitive stresses and strains, such as from tides and water currents, during its operational lifetime.

FIG. 7 illustrates one contemplated arrangement of various components of the marine barrier system 10 of the present invention. At its input end 112, the optic fiber wire 108 is connected to a light generator 114, The tight generator 114 may be a laser or a Class 1 laser diode with an output wavelength of either 850 nm or 1300 nm, among others. The light also may include wavelengths of visible light or of any other portion (or portions) of the electromagnetic spectrum. In one contemplated embodiment, the light falls within the infrared portion of the electromagnetic spectrum. The output end 116 of the optic fiber wire 108 is connected to a light receiver 118. The light receiver 118 may be any type of receiver including a PIN Diode, for example.

The light generators 114 and light receivers 118 may be positioned adjacent to individual panels 110 of the optic fiber net 14. Since this means that the light generators 114 and light receivers 118 will be exposed to the environment, each unit is preferably constructed to withstand wind, rain, snow, heat, and cold, among other environmental conditions.

The light generators 114 and light receivers 118 are, in turn connected to a monitoring station 120, which is usually positioned at a location remotely from the individual light generators 114 and receivers 118. The connection to the monitoring station 120 may be via a wired connection or a wireless connection, as should be appreciated by those skilled in the art. If the connection is wireless, in one embodiment, the transmission of signals may be via any suitable transmission wavelength of electromagnetic radiation including, but not limited to radio waves, microwaves, and infrared light. While not enumerated, other transmission method and means also may be employed without departing from the scope of the present invention.

In one embodiment of the marine security system 10 of the present invention, the signals processed may be light signals. In another embodiment, the light signals may be converted to electrical signals for processing. For example, being a computing device, the monitoring station 120 is contemplated to operate via electrical signals.

When the monitoring station 120 communicates to one or more of the light generators 114 and light receivers 118 via a wired connection, it is contemplated that the wired connection will be optical. Accordingly, the electrical signals processed by the monitoring station 120 must be converted to light signals for transmission to the locations of the light generators 114 and light receivers 118. To accomplish this, it is contemplated that the electrical signals will be converted to light signals via a RS-232 (or EIT-232) connection, When the optical signal is received by one or more of the generators 114 and/or receivers 118, the light signals are converted back to electrical signals via, a RS-232 (or EIT-232) connection. In other words, conversion between light and electrical signals may occur at one or more locations within the marine security system 10 of the present invention, as would be appreciated by those skilled in the art.

It is also contemplated that the microprocessor with be provided with a RS-232 (or EIT-232) port so that the microprocessor may be programmed via an external microprocessor, such as a laptop computer, personal data assistant, etc.

The same port also provides access to the microprocessor for diagnostic purposes and maintenance purposes, as would be appreciated by those skilled in the art.

The monitoring station 120 preferably includes a microcomputer (not shown) that sends and receives the various signals from the light generators 114 and the light receivers 118. The microcomputer may include a graphical user interface (GUI), for example, that permits monitoring of the operation of the marine security system 10. The microcomputer may permit calibration of the marine security system 10 and permit input to adjust the sensitivity of the system 10, among other features.

It is noted that the term "microcomputer" is intended to be given a broad interpretation. To avoid any misunderstandings, any of the following may be the type of microcomputer employed: (1) a personal computer, (2) a laptop computer, (3) a mainframe computer, (4) a personal data assistant (or "PDA"), etc. The microcomputer may have a program loaded with a memory (such as a Random Access Memory ("RAM")) to trigger an alarm. Alternatively, the program may be hardwired into the microcomputer in some other contemplated variations.

It is contemplated that one or more local control boxes 121 may be incorporated into the marine barrier system 10 of the present invention. This alternative construction is also shown in FIG. 7. In this embodiment, signals to and from the generator 114 and the receiver 118 are processed by the local control box 121 as an intermediate to the monitoring station 120.

Figure 20:
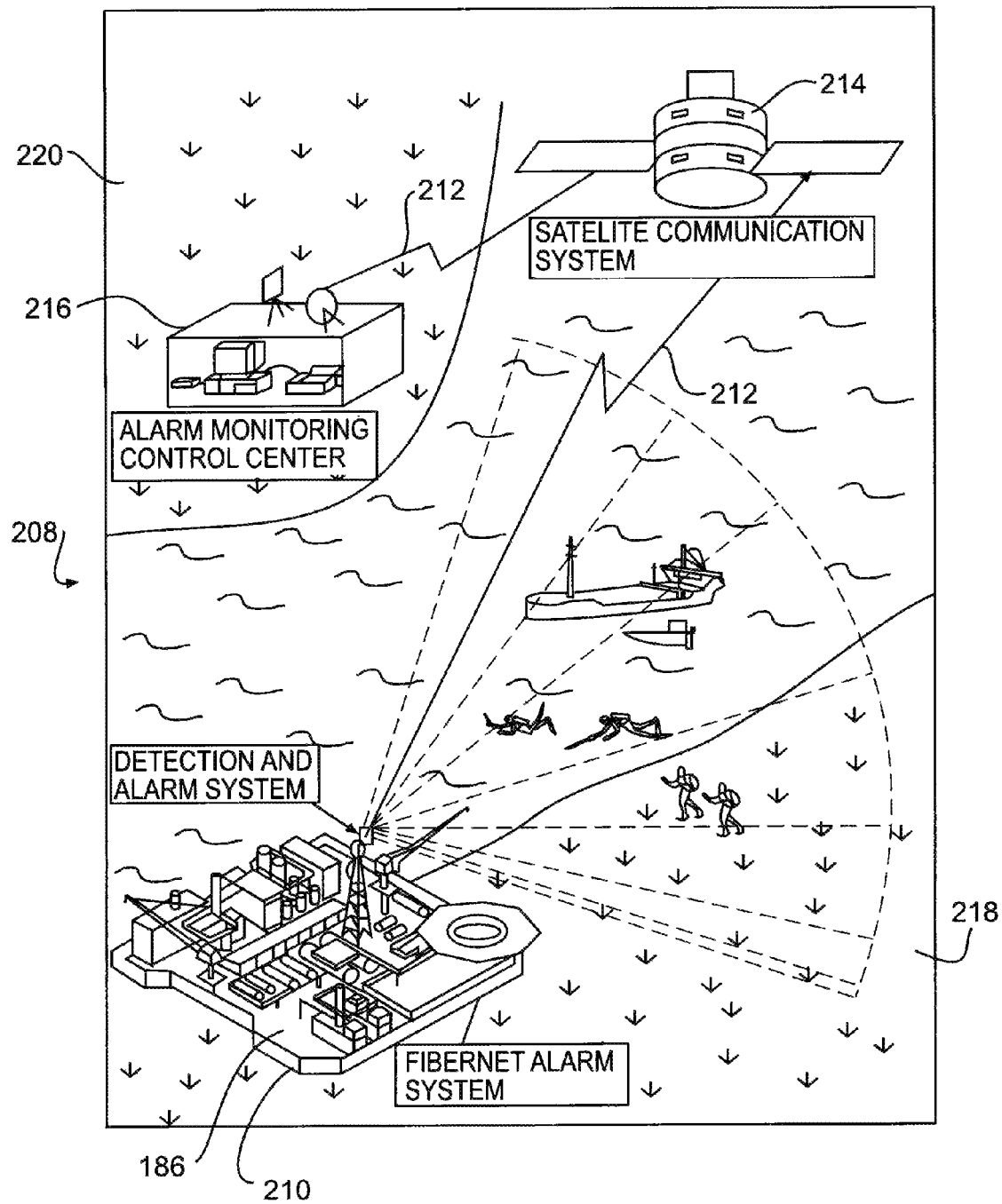
FIG. 20 is a schematic illustration of one possible integration of the marine barrier system of the present invention with a remote monitoring station.

In yet another contemplated embodiment, it is conceivable that the monitoring station 120 may be at a location that is quite remote from the marine security system 10 that it monitors. For example, the monitoring station 120 may be located in one state (or local principality or foreign country) while the marine security system 10 is located in another state (or local principality or foreign country). In this embodiment, the monitoring system 120 may be connected to the security system via the Internet. One contemplated configuration is illustrated in FIG. 20, which is discussed below.

In still another embodiment, it is contemplated that a monitoring station 120 may be connected to and may monitor the operating parameters of several marine barrier systems 10 simultaneously. For example, several marine barrier systems 10 could be installed in disparate locations. The several marine security systems 10 may feed detection information to a single monitoring station 120. When the monitoring station 120 detects a security breach, an alarm can be triggered so that security personnel may be dispatched to the appropriate location. One advantage of a centralized monitoring station 120 is a reduction in the cost of monitoring several marine security systems 10 simultaneously.

The marine security system 10 operates to generate an alarm if there is a break in the optic fiber net 14, as discussed below. It is also possible for the marine security system to generate an alarm if a strain is placed on the optic fiber net 14 that exceeds a predetermined threshold.

Light emitted by the light generator 114 is introduced into the optic fiber wire as a light input. The light input signal is conducted through the optic fiber wire 108. At the other end of the optic fiber wire 108, a light signal is outputted as an output light signal, which is received by the light receiver 118. During operation, should a person cut through the optic fiber net 14, the light signal conducted by the optic fiber wire 108 will be interrupted. The light receiver 118 will detect the absence of a light output signal. As a result, the monitoring station 120 will respond by generating an alarm signal. The alarm signal may trigger, among other types of alarm indications, a visible and/or an audible alarm.

Even if the optic fiber wire 108 in the optic fiber net 14 is not cut, it is possible that the light passing through the optic fiber wire 108 may be sufficiently degraded to trigger an alarm under certain circumstances.

As should be appreciated by those skilled in the art, light in an optic fiber reflects off of the interior walls of the optic fiber as the light travels through the fiber. Bends in the optic fiber typically result in a loss of some of the light travelling therethrough. When an optic fiber is bent to a significant degree (e.g., a small radius of curvature), a significant amount of light may be lost from the optic fiber.

With this in mind, it is contemplated that, if pressure is applied to the optic fiber 108 so that the optic fiber wire 108 includes a bend with a small radius of curvature, the light travelling through the optic fiber wire 108 may be lost (either partially or wholly) and, therefore, not reach the light receiver 118. Any forces acting on the optic fiber net 14, therefore, potentially may cause a loss of some of the transmitted light. If the transmitted light falls below a predetermined threshold, the monitoring station 120 will trigger an alarm.

It is also possible that light having a specific pattern may be introduced into the optic fiber wire 108. In this embodiment, stresses and strains on the optic fiber wire 108 will alter the light pattern. If the light receiver 118 detects a deviation from the original light pattern that exceeds the predetermined threshold the monitoring station will trigger an alarm.

The light patterns that pass through the optical fiber 108 are referred to as "speckle patterns." The exact details of the speckle patterns are not critical to the operation of the present invention. In fact, each security installation may rely on a different speckle pattern so that intruders familiar with the general construction and operation of the marine barrier system 10 of the present invention may not learn the details of one speckle pattern and employ that knowledge to breach others of the same security systems 10 at different locations. In addition, it is contemplated that the speckle pattern for a particular installation may be altered periodically so that the same speckle pattern is not employed all of the time. For example, it is expected that the speckle pattern may be rotated through a series of different patterns on a regular basis, such as hourly, daily, weekly, or whatever period is desired. This is expected to decrease the possibility that an intruder may be able to reverse engineer the speckle pattern and introduce a false speckle pattern designed to "trick" the system 10 and, thereby, gain access to the secure marine perimeter.

It is contemplated that any vibration (or disturbance) of the optical fiber wire 108 will disturb the speckle pattern carried thereby. This alters the speckle pattern, which alteration is detected by the light receiver 118 (or microprocessor). If the pattern deviates more than a predetermined amount from the initial signal, an alarm is triggered.

It is contemplated that the sensitivity of the marine barrier system 10 will be selected for each installation depending on the required level of security and also upon environmental conditions. Preferably, the sensitivity of the marine barrier system 10 will be such that the speckle pattern through the optical fiber 118 will trigger an alarm only upon the detection of a disturbance of a predetermined magnitude. The sensitivity of the marine security system 10 may be adjustable via interaction through the GUI (or other input/output device) associated with the microcomputer or computer, as the case may be.

Another type of intrusion that the marine security system 10 detects is a break in the optic fiber net 14, as discussed above. If the optic fiber net 14 is broken, the light signal traveling through the optic fiber 108 is terminated, initiating an alarm.

As may be appreciated from the foregoing discussion, the sensitivity of the optical sensor wire(s) 108 is such that they may also detect other types of intrusions and attempted intrusions including, but not limited to, an attempt to lift and/or swim under the optical fiber net 14.

FIG. 8 illustrates an alternative embodiment of the marine security system 10 of the present invention. Here, the junctures 122 where the optic fiber 108 crosses itself are provided with a fastener 124. The fastener 124 is also referred to as a "button." The buttons 124 are provided, preferably at each juncture 122. While the exact structure and configuration of the buttons 124 are not the subject of the instant application, one function of the buttons 124 is to help cause a break of the optic fiber wire 108 if an intruder attempts to break or remove one of the buttons 124. The buttons 124 may be ultrasonically welded to the optic fiber wire 108 at the junctions 122. Naturally, while ultrasonic welding is one possible way to attach the buttons 124 at the junctures 122, ultrasonic welding is not required to practice the invention and adhesives, and other fasteners are contemplated to fall within the scope of the invention.

When the fiber optic net 14 is woven, its structure is such that the fiber optic 14 retains its configuration, much like a sweater keeps its shape despite being woven from a continuous strand of yarn. Accordingly, the buttons 124 are not required to maintain the fiber optic net 14 in its net-like configuration. However, the buttons 124 are a preferred additional security feature because, as discussed, if an intruder tampers with a button 124, the result will be a breakage of the optic fiber wire 108, which will trigger an intruder alarm.

It should be noted that, in one contemplated embodiment of the present invention, a button 124 is placed at each juncture 122. This assures that if any button 124 is tampered with, the optic fiber 108 will break and an alarm will sound. The addition of buttons 124, however, translates into an increased weight of the fiber optic net 14. Increasing the number of buttons 124 also adds to the manufacturing cost of the optic fiber net 14. Accordingly, it is contemplated that a button 124 will not be provided at each and every juncture 122. In fact, it is contemplated that the buttons 124 may be arranged advantageously in a specific pattern to maximize effectiveness while minimizing both weight and cost. Alternatively, the buttons 124 may be arranged randomly, if desired.

While not needed to maintain the optic fiber wire 108 in a net-like configuration for the fiber optic net 14, the buttons 124 are believed to assist in maintaining the fiber optic net 14 in its preferred orientation. Therefore, while it is recognized that the buttons 124 are not needed to practice the invention, the inclusion of at least some buttons 124 may prove useful.

The buttons 124 may be any suitable type as would be appreciated by those skilled in the art. For example, the buttons 124 may be made from any suitable material including plastic, metal, a composite material, etc. Alternatively, instead of using buttons 124, a thermoplastic material may be deposited at the junctures 122 in a molten state that hardens upon cooling. To this end, the optic fiber wire 108 may be coated with a thermoplastic resin during the weaving process so that the coating of the optic fiber wire 108 fastens the optic fiber wire 108 to itself at the junctures 122. Alternatively still, the junctures 122 could be provided with a suitable adhesive in the place of the buttons 124. The wide variety of fasteners 124 that may be employed are too numerous to list, as would be appreciated by those skilled in the art, and the scope of the present invention is not intended to be limited to the specific embodiments (i.e., the buttons 124) discussed above.

Figure 6:
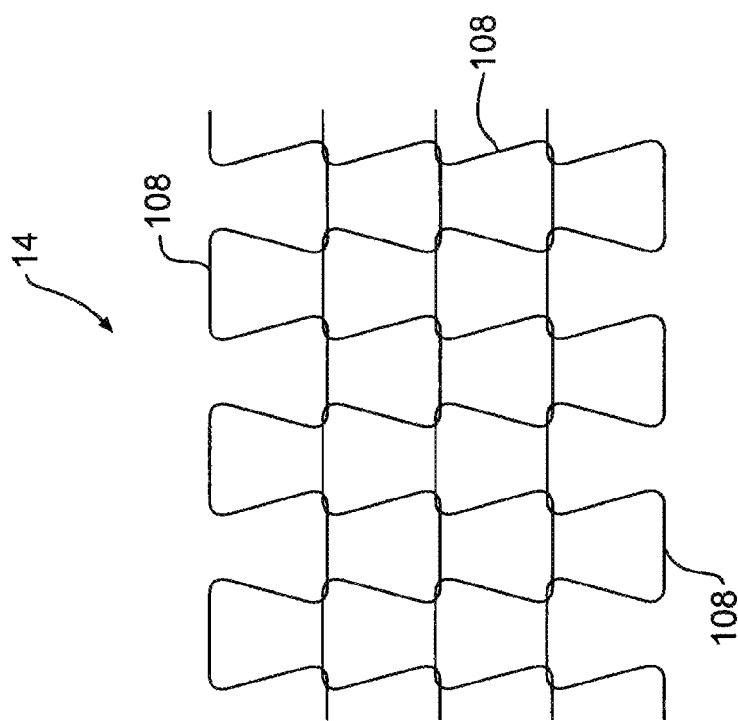
FIG. 6 is an illustration of a portion of one contemplated embodiment of the optic fiber net that is incorporated into the marine barrier system of the present invention.

It is also noted that the specific weave pattern of the optic fiber net 14, which is illustrated in FIG. 6, is merely a preferred pattern of weaving the optic fiber wire 108 into the optic fiber net 14. Other patterns also may be employed and are too numerous to list herein. The other weave patterns, which would be appreciated by those skilled in the art, are also contemplated to fall within the scope of the invention.

The optic fiber 108 may have any number of different constructions. Two are suggested below, but they are not required to practice the present invention.

Figure 9:
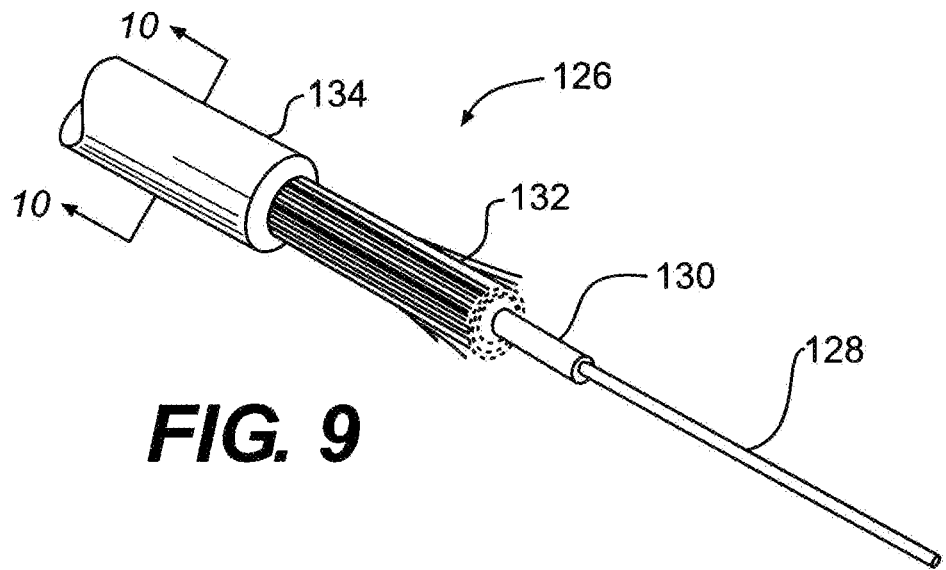
FIG. 9 is a perspective illustration showing a first contemplated embodiment for the construction of the optic fiber wire forming the optic fiber net that is incorporated into the marine barrier system of the present invention.
Figure 10:
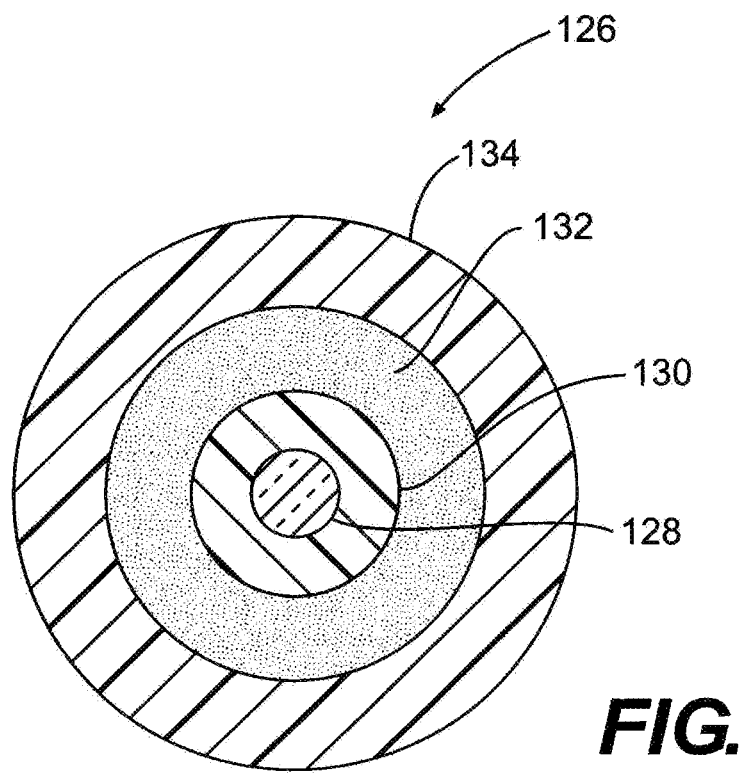
FIG. 10 is a cross-sectional illustration of the optic fiber wire shown in FIG. 9.

FIGS. 9 and 10 illustrate a first embodiment of an optic fiber wire 126. The optic fiber wire 126 include an optic fiber 128 surrounded by a jacket 130. The jacket 130 is surrounded by a plurality of strength fibers 132, such as Kevlar® fibers. The strength fibers 132 are surrounded by an outer jacket 134.

It is contemplated that the strength fibers 132 will be made from, will contain, will be coated with, or will be impregnated with a water swellable material. The water swellable material is provided in case the outer jacket 134 of the optic fiber wire 126 becomes damaged. Should the outer jacket 134 become damaged, water entering into the optic fiber wire 126 should be arrested in its creep within the optic fiber wire 126 by the presence of the water swellable material.

It is noted that, if water were to penetrate both the outer jacket 134 and the inner jacket 130, contact between the optic fiber 128 and the water would likely result in a change in the light transmissivity of the optic fiber 128. It is anticipated, for example, that there may be greater light losses through the section of the optic fiber 128 that is in direct contact with water. As a result, it is anticipated that degradation of the cladding for the optic fiber wire 126 may be detected as a decrease in the light transmission from the light generator 114 to the light receiver 118. In other words, if the cladding for the optic fiber wire 126 were to become compromised, even though the optic fiber 128 has not been damaged, the monitoring station may be programmed to trigger an alarm so that the degraded section of the optic fiber net 14 may be replaced.

Figure 11:
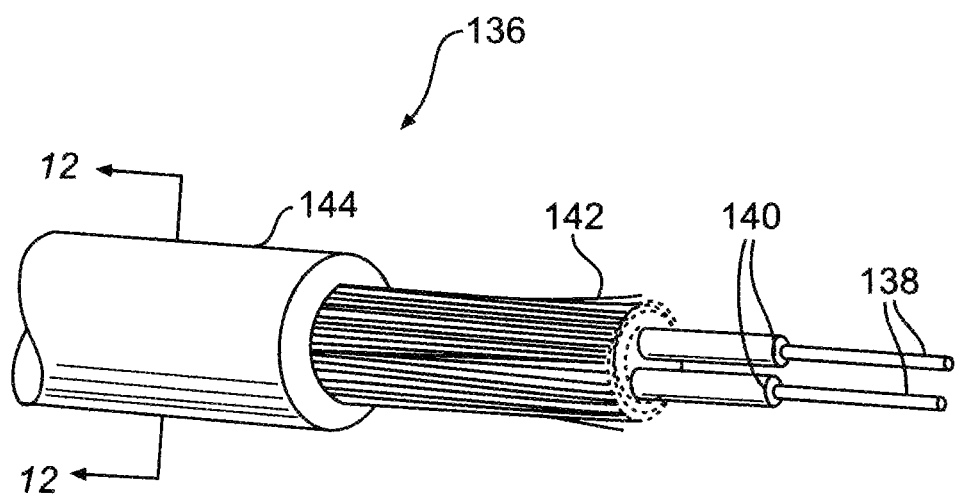
FIG. 11 is a perspective illustration of a second contemplated embodiment for the construction of the optic fiber wire forming the optic fiber net that is incorporated into the marine barrier system of the present invention.
Figure 12:
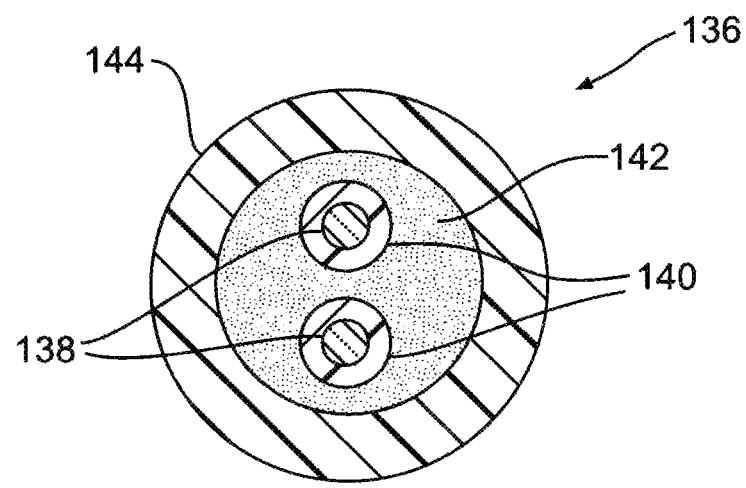
FIG. 12 is a cross-sectional illustration of the optic fiber wire shown in FIG. 11.

FIGS. 11 and 12 illustrate an optic fiber wire 136 that includes two optic fibers 138, each of which are encased in jackets 140. The two optic fibers 138 are surrounded by strength fibers 142. The assembly is encased in an outer jacket 142. This embodiment illustrates a fiber optic wire 136 with two optic fibers. As should be apparent, a larger number of optic fibers may be employed without departing from the scope of the present invention.

As illustrated in FIGS. 9 and 10, the optic fiber wire 126 has a multi-mode optic fiber 128 at its core. The optic fiber 128 is a 62.5/125 multi-mode fiber with a silica/germania core with a diameter of 62.5±3 µm. Alternatively, the optic fiber 128 may be a 50/125 multi-mode fiber with a silica/germania core with a diameter of approximately 50 µm. The core is silicon cladded to a diameter of 125±2 µm. A tight buffer or jacket 130 is provided around the optic fiber 128 to a diameter of 900±100 µm. The tight buffer 130 may be Teraflex PVC 126, or equivalent. An aramid yarn 132 is stranded around the tight buffer 130. The aramid yarn 132 may be Kevlar® or Twaron®. Eight yarns of 1580 dtx are used. A green polyurethane jacket 134 is extruded over the aramid yarn 132 with a minimum thickness of 1 mm. The green polyurethane jacket 134 may be Goodrich 58202, Goodrich 58304, or a Wilson green masterbatch with UV protection 140GN20. The final diameter of the optic fiber cable 126 is 4.0±0.01 mm. The optic fiber cable 126 has a minimum bending radius of 2.5 mm, which permits knotting of the cable 126 without breakage of the optic fiber 128.

As illustrated in FIGS. 10 and 11, the optic fiber wire 136 has two multi-mode optic fibers 138 at its core. The optic fibers 138 are 62.5/125 multi-mode fibers with a silica/germania core with a diameter of 62.5±3 µm. Alternatively, the optic fiber 138 may be a 50/125 multi-mode fiber with a silica/germania core with a diameter of approximately 50 µm. The core of each fiber 138 is silicon cladded to a diameter of 125±2 µm. A tight buffer or jacket 140 is provided around each optic fiber 138 to a diameter of 900±100 µm The tight buffer 140 may be Teraflex PVC 126, or equivalent. An aramid yarn 142 is stranded around the tight buffer 140. The aramid yarn 142 may be Kevlar® or Twaron®. Eight or more yarns of 1580 dtx are used. A green polyurethane jacket 144 is extruded over the aramid yarn 142 with a minimum thickness of 1 mm. The green polyurethane jacket 144 may be Goodrich 58202, Goodrich 58304, or a Wilson green masterbatch with UV protection 140GN20.

It is also contemplated that the marine security system 10 of the present invention may rely on optic fibers with a larger or smaller diameter. For example, the marine security system 10 may incorporate optic fibers 128, 138 with a 50 µm diameter, as would be appreciated by those skilled in the art.

Additionally, as noted, it is contemplated that the fiber optic wires 126, 136 may incorporate "swellable" aramid yarn fibers therein. Kevlar® fibers are one such example, although many alternatives may be employed without departing from the scope of the invention. Incorporating swellable fibers into the optic fiber wires 126, 136 offers further advantages. Swellable fibers absorb water and swell as a result of the absorption of water. If swellable fibers are incorporated in the optic fiber wires 126, 136, and if the polyurethane jacket 134, 144 becomes damaged, the fibers will absorb water that enters the optic fiber wires 126, 136 and prevent the water from migrating within the optic fiber wires 126, 136. Moreover, swellable optic fibers also help to prevent water from reaching the optic fibers 128, 138 because the fibers prevent for at least inhibit) the radial migration of water within the optic fiber wires 126, 136.

Figure 13:
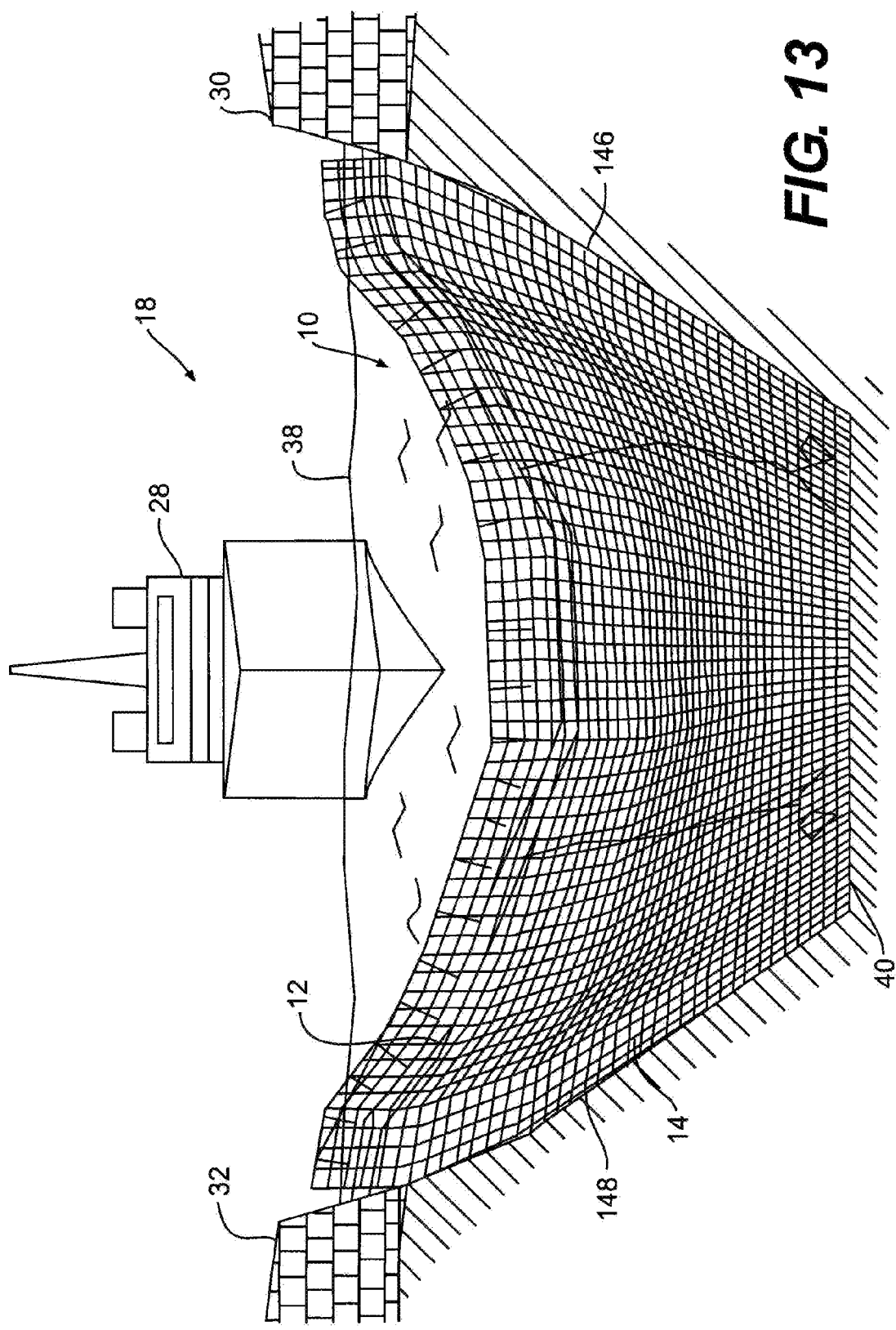
FIG. 13 is an illustration of the marine barrier system of the present invention, deployed across the opening of a harbor, for example, in a manner similar to that illustrated in FIG. 1.

Reference is now made to FIG. 13, which illustrates one contemplated embodiment of the marine barrier system 10 of the present invention. This illustration is intended to be understood in connection with FIG. 1, for example. As noted with respect to Hal the marine barrier system 10 is connected between shore points 30, 32, which may be natural formations or may be man-made formations, as illustrated in FIG. 13. The optic fiber net 14 extends from a point above the waterline 38 and the sea floor 40. As farther illustrated in FIG. 13, the optic fiber net 14 extends from side walls 146, 148 associated with the shore points 30, 32, respectively. The platforms 12 are illustrated in a simplistic fashion in this illustration. The ship 28 is illustrated here, as in FIG. 1 and may be free-floating or adjacent to a dock 26, as shown in FIG. 1.

Figure 14:
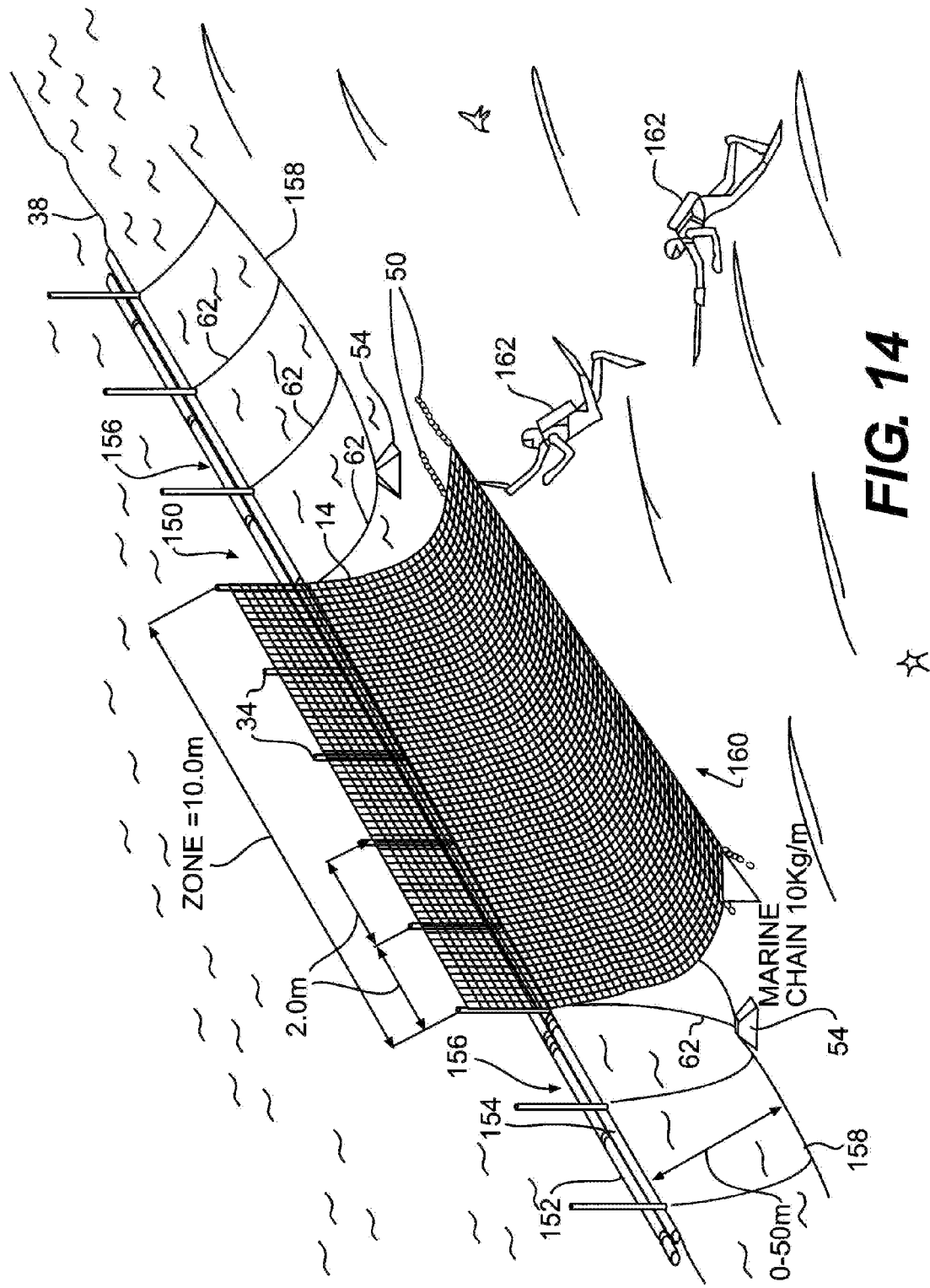
FIG. 14 is a perspective illustration of another embodiment contemplated for the present invention, illustrating an alternative arrangement contemplated for the marine barrier system of the present invention.

FIG. 14 illustrates another contemplated embodiment of the marine barrier system 150 contemplated by the present invention. Here, the floating platforms 12 are replaced with floating pipes 152, 154 that are disposed adjacent to one another and float on the waterline 38. The floating pipes 152, 154 are connected to one another to form separate floating platforms 156. The floating platforms 156 are connected to one another to establish a continuous floating platform as with the marine barrier system 10.

As should be appreciated by those skilled in the art, while two floating pipes 152, 154 are illustrated, the marine barrier system 150 is not limited solely to this embodiment. To the contrary, a larger or a fewer number of floating pipes 152, 154 may be employed without departing from the scope of the present invention.

As in the previous embodiments, the optic fiber net 14 extends both above and below the waterline 38. The optic fiber net 14 is connected to the uprights 34 that extend upwardly from the floating platforms 156. The marine barrier system 150 is anchored to the sea floor 40 by one or more anchors 54, which may be concrete blocks, as illustrated. The anchors 54 connect to the floating platforms 156 via one or more anchor lines 62, as previously described.

In this embodiment, the anchors 54 are connected to one another via an anchor connecting line 158. The anchor connecting line 158 may be a cable, rope, chain, or other suitable connecting line, as should be appreciated by those skilled in the art. The anchor lines 62 in this embodiment are connected between the anchors 54 and the floating platforms 156. The anchor lines also extend from intermediate points on the anchor connecting lines 158 to the floating platforms 156. This arrangement provides additional connection points between the floating platforms 156 and the anchors 54 without creating a need for a large number of anchors 54 to be employed. This has an advantage in that a fewer number of anchors 54 may be used.

It is noted that the anchor lines 62 in this embodiment of the marine barrier system 150 of the present invention are anticipated to be between about 0 and 50 meters (m) in length. As may be appreciated by those skilled in the art, longer anchor lines 62 may be employed without departing from the scope of the present invention. However, it is anticipated that the longer anchor lines 62 may permit the floating platforms 156 to float on the waterline 38 to too great a degree on either side of the anchors 54. In other words, the longer the anchor lines 62, the greater will be the lateral float of the floating platforms 156, especially in conditions where there is a measurable change in water depth. This may occur in areas where there is a significant change in water depth due to tides, for example. As a result, in some cases, there may be limit as to the length that may be acceptable for the anchor lines 62.

In this embodiment of the marine barrier system 150, the uprights 34 are spaced apart by a distance of about 2.0 meters. Of course, a larger or a smaller distance may be employed without departing from the scope of the present invention. In addition, the optic fiber net 14 is intended to be installed in panels 160 that are approximately 10.0 meters in width. Installing the optic fiber net 14 in separate panels offers a number of advantages. For example, if a diver 162 were to cut through one panel 160, thereby triggering an alarm, the alarm may be localized to the individual panel 160, thereby permitting security to be dispatched to the location where the panel 160 has been breached. In addition, with separate panels 160, it is possible to replace one panel 160 without having to replace the entirety of the optic fiber net 14.

With respect to the marine barrier system 150 illustrated in FIG. 14, the panel is about 10.0 meters wide. While this width is contemplated for this embodiment, a wider or a narrower panel 160 may be used without departing from the scope of the present invention.

Also illustrated in FIG. 14 are two chains 50 that are positioned adjacent to the bottom of the optic fiber net 14. As discussed previously, the chains 50 weigh down the bottom end of the optic fiber net 14 so that it remains in contact with the sea floor 40. In the embodiment illustrated in FIG. 14, the chains have an approximate weight of 10 kilograms per meter (kg/m). Of course, a heavier or a lighter weight chain may be employed, as required or desired for a particular installation.

Figure 15:
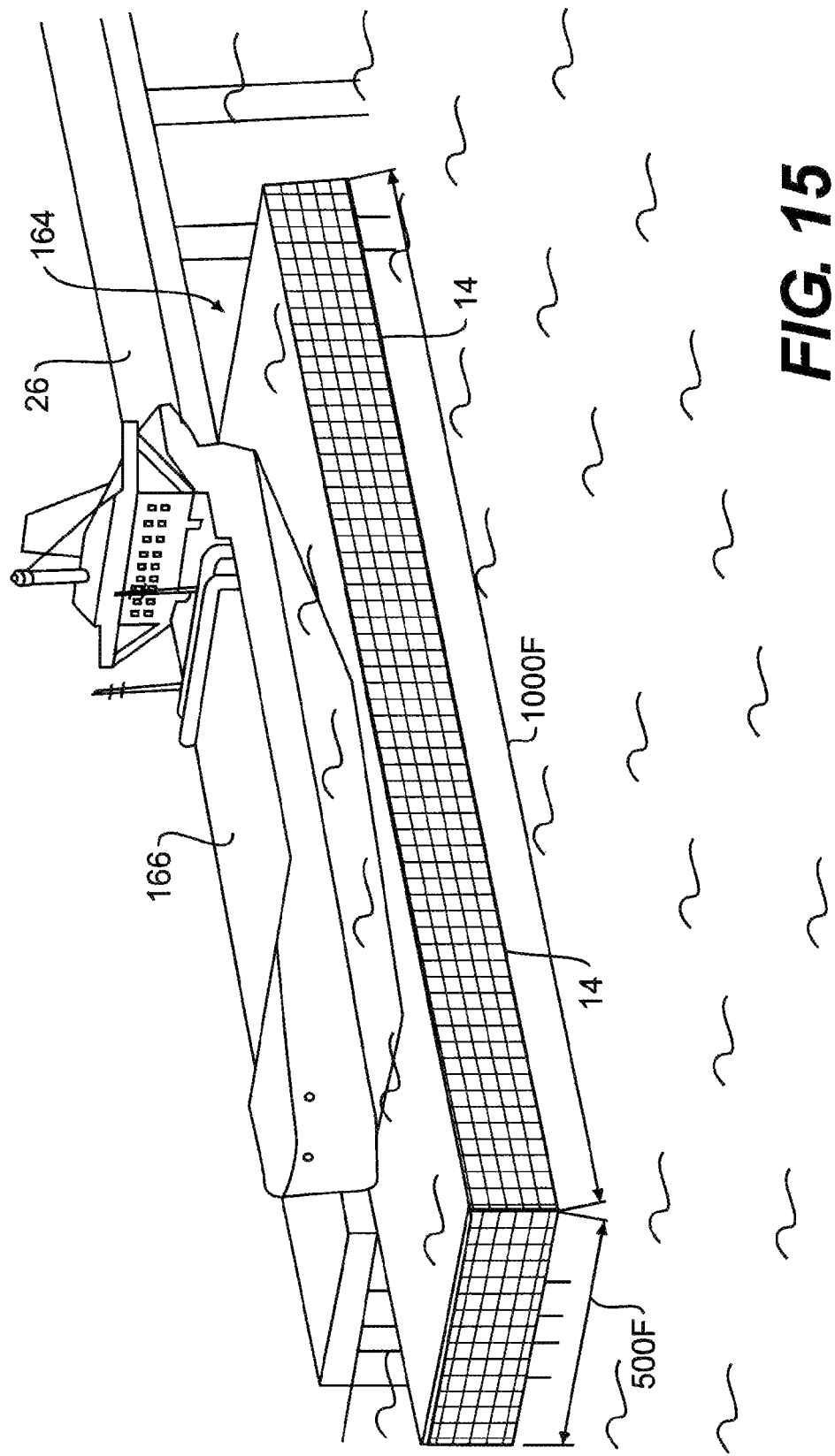
FIG. 15 is a perspective illustration of the marine barrier system of the present invention, deployed to surround a vessel, for example.

FIG. 15 illustrates a further embodiment of the marine barrier system 164 according to the present invention. Here, the marine barrier system 164 is deployed around the perimeter of a ship 166, such as a cargo ship 166. In this embodiment, the optic fiber net 14 is deployed in a rectangle around the cargo ship 166. As may be appreciated from the drawing, the optic fiber net 14 is disposed a sufficient distance from the cargo ship 166 to provide an adequate security buffer. In this embodiment, the rectangle has a size of approximately 500 feet (152.40 meters) by about 1000 feet (304.8 meters). As noted above, the specific size is merely exemplary and is not intended to be limiting of the invention.

Figure 16:
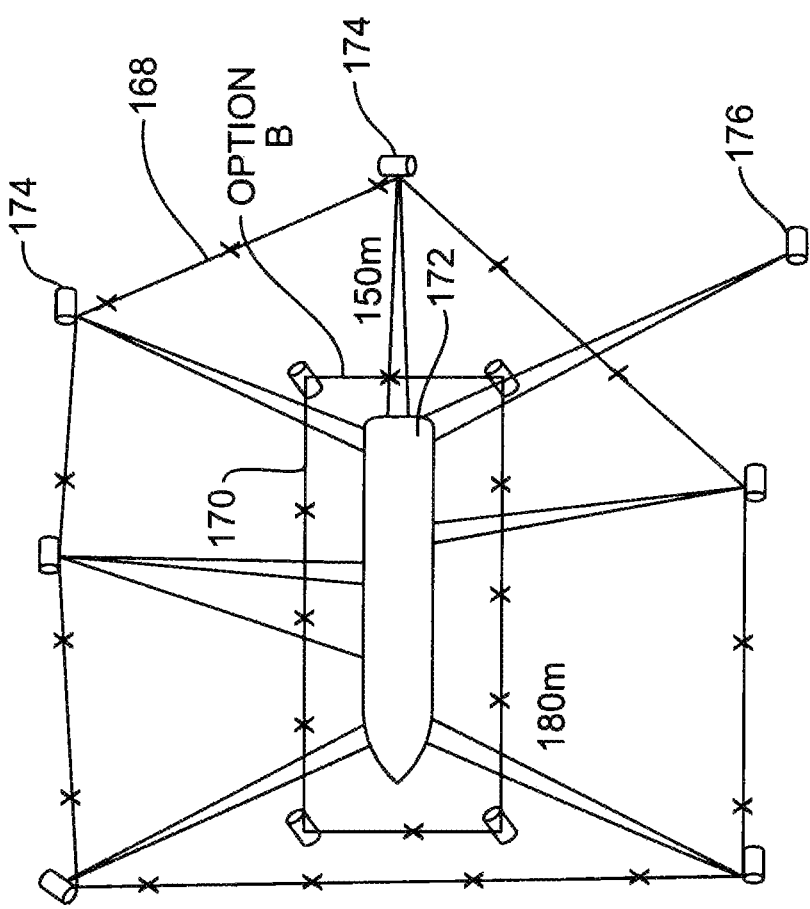
FIG. 16 is a top plan view of the marine barrier system of the present invention, deployed in a double-barrier arrangement around a vessel, for example.

FIG. 16 illustrates yet another embodiment of the present invention where two marine barrier systems 168, 170 are nested, one within another around a vessel or ship 172. The marine barrier system 170 may be the same as the marine barrier system 164 discussed in connection with FIG. 15. As illustrated, the marine barrier system 170 is rectangularly shaped. The marine barrier system 168, on the other hand, is polygonally shaped. As may be appreciated, employing two marine barrier systems 168, 170 in a nested configuration, security around the vessel 172 will increase the security of the perimeter around the vessel 172. The marine barrier systems 168, 170 further include sonar detectors 174 positioned at various locations around the vessel 172 to further enhance the security of the system. It is also contemplated that the marine barrier systems 168, 170 may operate in conjunction with one or more remote sonar buoys 176 disposed at a location remote from the vessel 172.

Figure 17:
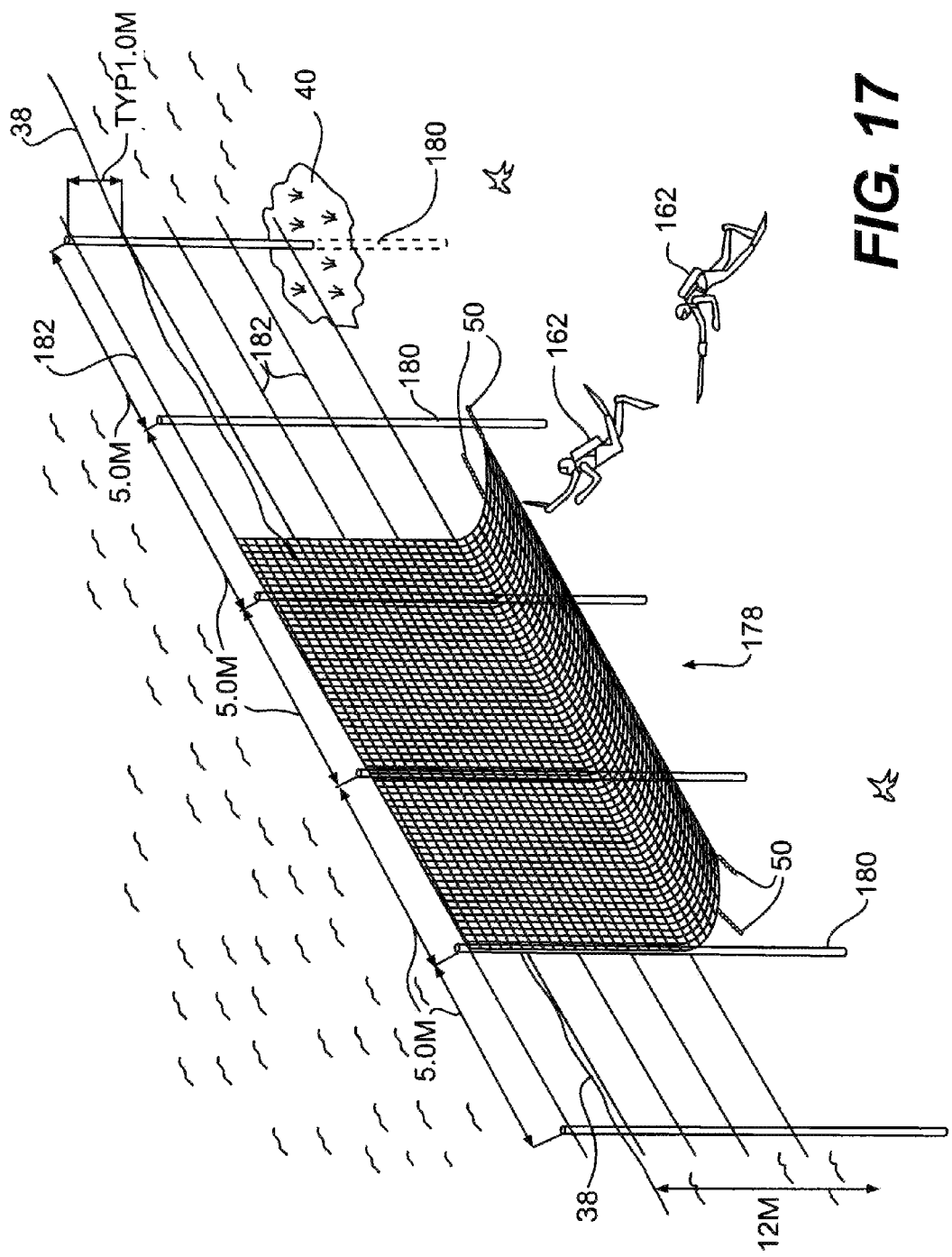
FIG. 17 is a perspective illustration of still another contemplated embodiment of the marine barrier system of the present invention.

FIG. 17 illustrates yet another embodiment of the marine barrier system 178 present invention where the optic fiber net 14 is secured to one or more rigid posts 180. The rigid posts 180 are positioned approximately 5.0 meters apart from one another, as indicated in the drawing. The optic fiber net 14 extends, in this embodiment, approximately 1.0 meters above the waterline 38. The optic fiber net 14 extends approximately 12.0 meters below the waterline 38. As should be appreciated, these heights are merely exemplary and are not intended to be limiting of the present invention.

As indicated in FIG. 17, the rigid posts 178 are intended to be secured in the sea floor 40. At various heights, cables 182 extend horizontally across the rigid posts 180. The cables 182 provide additional strength to the optic fiber net 14 and also help to support the weight of the optic fiber net 14. The bottom of the optic fiber net 14 is provided with two weighted chains 50, as in prior embodiments.

It is anticipated that the marine barrier system 178 may be operated as its own system or may be combined with a marine barrier system that incorporates floating platforms. It is contemplated that, in some environments, the floating platforms 12, 156 may not present the most ideal point to which the optic fiber net 14 is connected.

Figure 18:
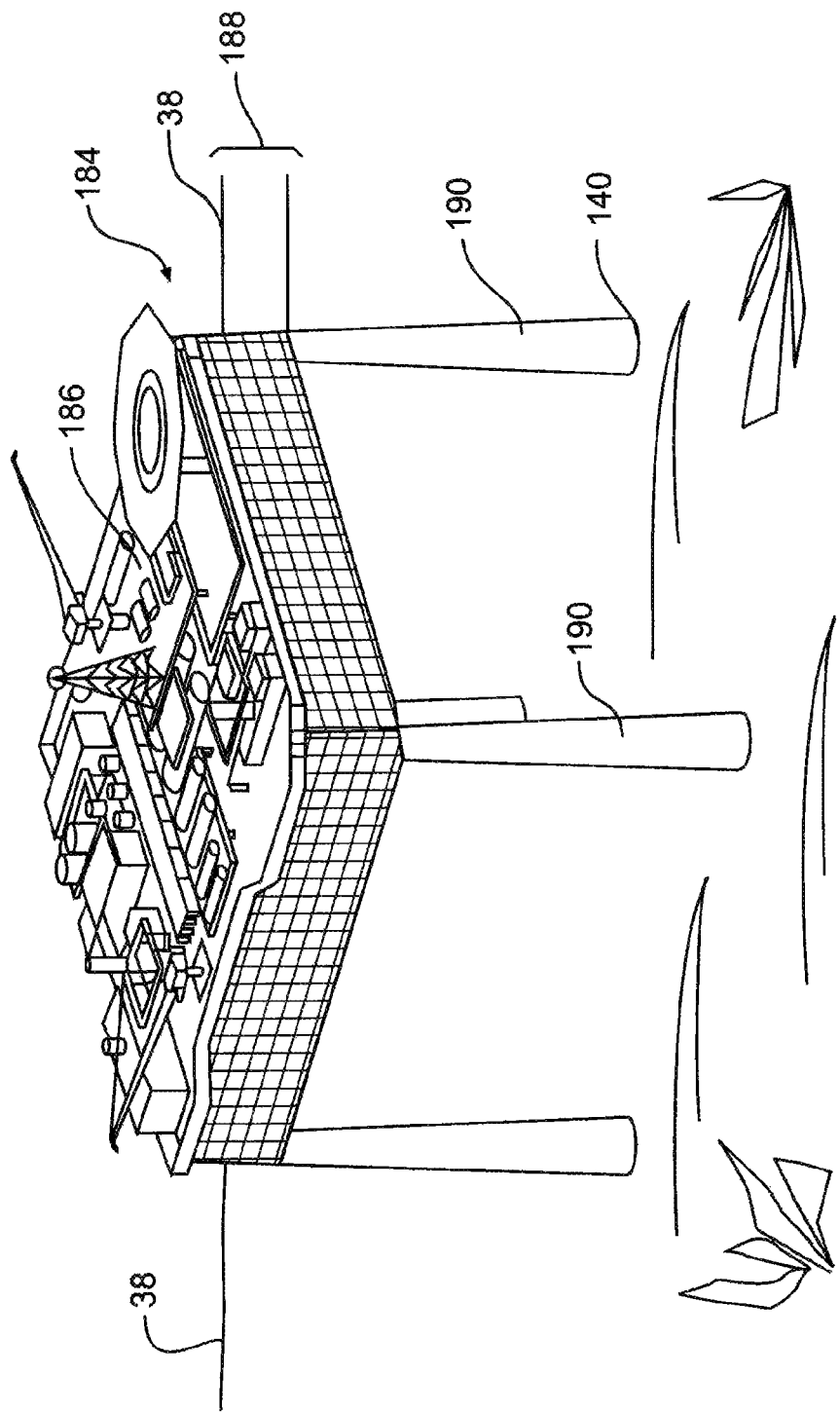
FIG. 18 is a further contemplated embodiment of the marine barrier system of the present invention, as applied to a fixed or floating deep-sea platform.

FIG. 18 illustrates one contemplated embodiment of the marine barrier system 184 of the present invention, where the optic fiber net 14 is connected to a fixed platform, such as a deep sea petroleum platform 186. Here, the fiber optic net 14 extends from a peripheral edge of the platform 186 above the waterline 38 to a depth 188 below the waterline. In this illustration, the depth is about 30.0 meters. Of course, the optic fiber net 14 may extend to a lesser or a greater depth 188 as required or desired.

As may be appreciated from FIG. 18, a typical platform 186 sits atop one or more supports 190 that sit on the sea floor 40. The height of the supports 190 may be quite large, depending upon the depth of the water in which the platform 186 sits.

While it is possible for the optic fiber net 14 to be deployed to a significant depth in the water, it is believed that the optic fiber net 14 need not extend to the sea floor 40 in cases where the water is quite deep. Since most attempted breaches of security are believed to come from threats, such as divers 162, there is a limit to which divers 162 may dive before swimming under the marine security system 184 becomes impractical.

Figure 19:
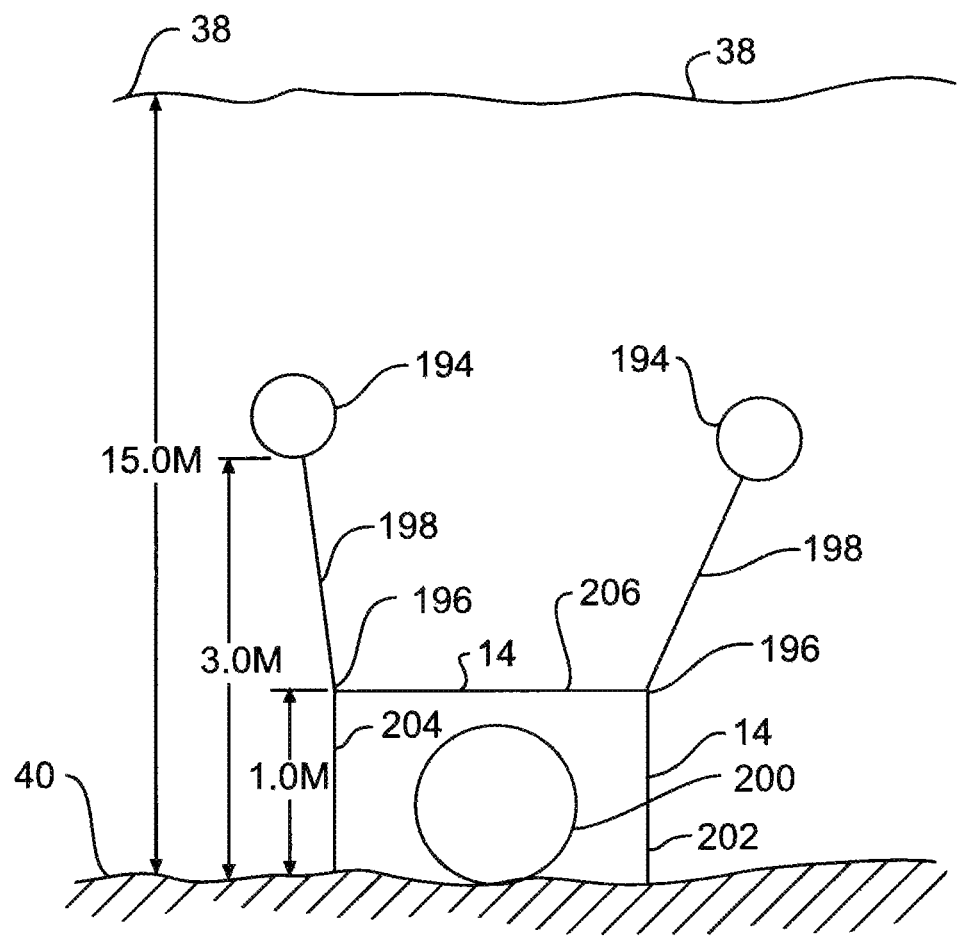
FIG. 19 is another contemplated embodiment of the present invention, where the marine barrier system is deployed underwater to protect a submerged structure such as a pipeline.

FIG. 19 illustrates an additional embodiment of the marine barrier system 192 of the present invention. Here, the optic fiber net 14 is connected to buoys 194 that connect to predetermined locations 196 on the optic fiber net 14 via cables 198. As a result of this arrangement, the optic fiber net 14 forms a box around a submerged object, such as a pipeline 200. The optic fiber net 14 operates in the same fashion as discussed above.

In FIG. 19, the optic fiber net 14 is anticipated to be a single net that defines a first side 202, a second side 204, and a top 206. While not illustrated, the fiber optic net 14 also could define a bottom that extends under the submerged object 200. Alternatively, separate fiber optic nets 14 could be used for each of the sides 202, 240 and the top.

As illustrated, the sides 202, 204 may each be about 1.0 meters in height and the top may be about 2.0 meters in width or more. The buoys 194 are contemplated to float at a distance of about 3.0 meters from the sea floor 40. In the illustrated embodiment, the depth of the water is about 15.0 meters. As should be appreciated, all of these dimensions are merely exemplary as any size optic fiber net 14 may be employed at any depth.

FIG. 20 provides a schematic illustration of one contemplated monitoring system 208 of the present invention. Here, the marine barrier system 210 is deployed around a platform 186. If the optic fiber net 14 is cut, an alarm will be triggered. The alarm signal 212 will be sent, via a satellite 214 to a monitoring station 216. With this monitoring system 208, it is possible to monitor several deployments of the marine barrier system 210 of the present invention simultaneously. As a result, it is not necessary for each individual installation of the marine barrier system 210 to have its own dedicated monitoring station 216.

As should be apparent, the alarm signal 212 need not be transmitted via satellite 214. Instead, the alarm signal 212 may be transmitted via other wired or wireless communication channels.

As also should be apparent from FIG. 20, the monitoring station 216 may be located quite remotely from the marine barrier system 210. It is contemplated that the marine barrier system 210 may be located on or near one continent 218 while the monitoring station 216 is located on another continent 220. Still other variations are contemplated, as should be appreciated by those skilled in the art.

Figure 21:
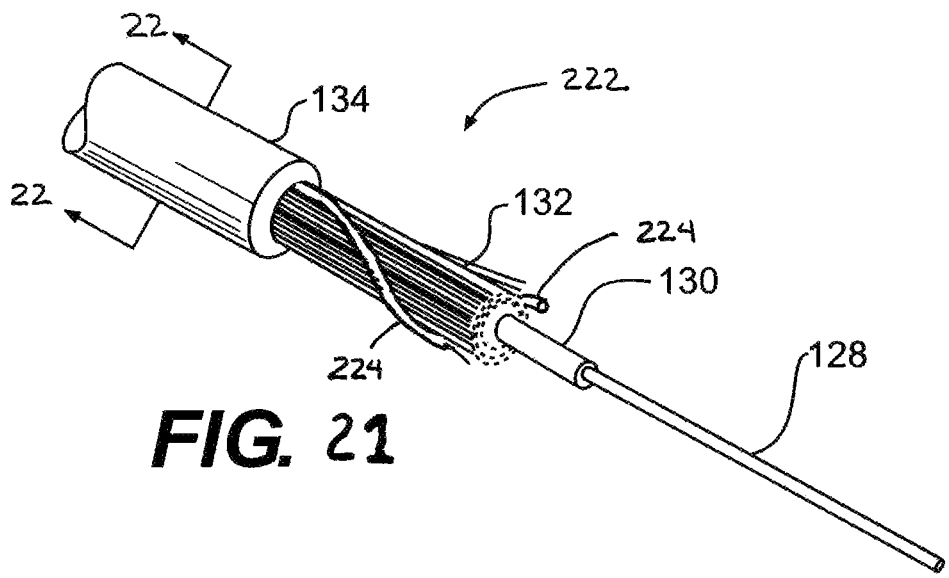
FIG. 21 is a perspective illustration showing a third contemplated embodiment for the construction of the optic fiber wire forming the optic fiber net that is incorporated into the marine barrier system of the present invention.

FIG. 21 provides a perspective view of a third embodiment of the fiber optic wire according to the present invention. This embodiment of the fiber optic wire 222 is similar to the first embodiment illustrated in FIG. 9. Here, a strength wire 224 has been added to the fiber optic wire 222. As before, the fiber optic wire 222 includes an optic fiber 128 surrounded by a jacket 130. The jacket 130 is surrounded by a plurality of strength fibers 132, such as Kevlar® fibers. The strength fibers 132 are surrounded by an outer jacket 134.

Figure 22:
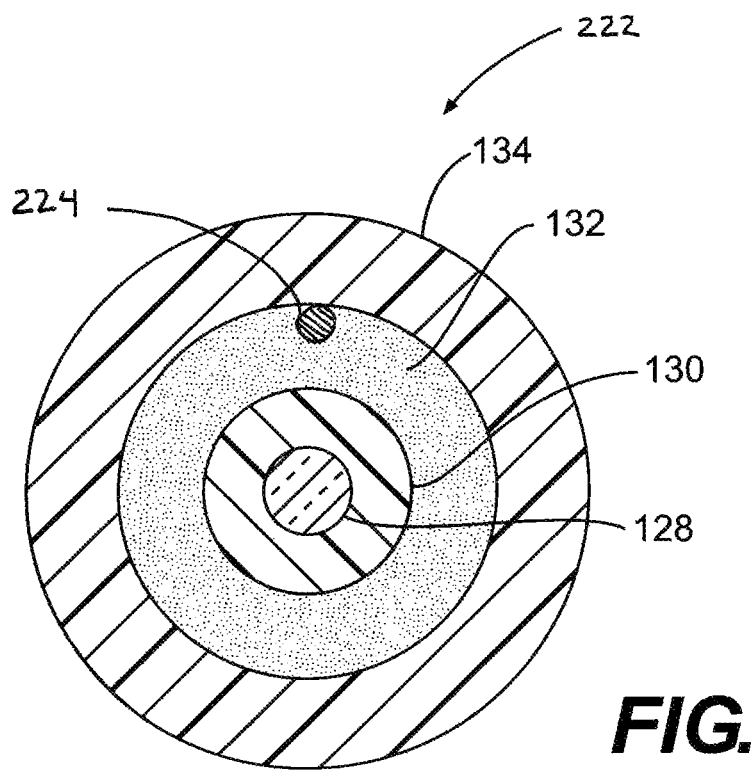
FIG. 22 is a cross-sectional illustration of the optic fiber wire shown in FIG. 21.

FIG. 22 is a cross-sectional illustration of the fiber optic wire 222, taken along the line 22-22 in FIG. 21. The position of the strength wire 224 is shown at the top of the optic fiber wire 222 illustration.

The strength wire 224 is contemplated to have a circular cross-section in this embodiment. However, a circular cross-section is not required to practice the present invention, as should be apparent to those skilled in the art. The cross-section may be oval, square, triangular, polygonal, etc., among other variations.

In addition, it is noted that the dimensions and/or the diameter of the strength wire 224 is not critical to the present invention. The strength wire 224 may have any suitable dimensions, as should be apparent to those skilled in the art, without departing from the scope of the present invention.

in this embodiment, the strength wire 224 is anticipated to be made from a metal or a metal alloy. Examples of contemplated metals and metal alloys include, but are not limited to steel, stainless steel, iron alloys, copper, copper alloys, titanium, titanium alloys, aluminum, and aluminum alloys, among others.

It is contemplated that the metal or metal alloys will provide sufficient tensile strength to withstand forces acting upon the optic fiber net 14 when the optic fiber net 14 is immersed in a marine environment. The metal or metal alloys also may provide a desirable rigidity to the optic fiber net 14.

In general, one force that is applied to the optic fiber net 14 is an upward force applied by the floating platforms 12 from which the optic fiber net 14 is suspended. As discussed above, the optic fiber net 14 is connected, at its top end, to one or more floating platforms 12. At its bottom end 48, the optic fiber net 14 is connected to the sea floor 40. As a result, when the floating platforms 12 rise with the waves, the floating platforms 12 pull upwardly on the optic fiber net 14. This upward pulling force is cyclic and repetitive. Over time, the cyclic force from the waves may diminish the overall strength of the optic fiber net 14. The strength wire 224 is provided to compensate for this by providing additional strength to the optic fiber wire 222.

Another force that acts on the optic fiber net 14 is a laterally-directed force. The laterally directed force may be applied from a number of sources. For example, a laterally-directed force may be applied by the platforms 12 on the optic fiber net 14 as they move with the currents and/or tidal flows in the marine environment. Currents and tidal flows also will apply pressure to the body of the optic fiber net 14 independent of the platforms 12, in addition, it is anticipated that organisms, such as fish, etc., may impact against the optic fiber net 14 and apply a laterally pressure thereagainst. The strength wire 224 is provided to strengthen the optic fiber wire 222 against these types of forces.

With respect to the strength wire 224, it is contemplated that materials other than metals and metal alloys may be employed. Possible materials include non-metallic strength fibers as carbon fibers, aramid fibers, nylons, polyimides, polyesters (and other polymers), and the like. These non-metallic strength fibers may be employed instead of the metallic strength materials.

As should be apparent from FIGS. 21 and 22, the strength wire 224 occupies a portion of the space otherwise occupied by the strength fibers 132. In other words, it is contemplated that the overall cross-sectional dimensions of the optic fiber wire 222 will be the same as other embodiments. Alternatively, the diameter of the optic fiber wire may be larger or smaller than other embodiments without departing from the scope of the present invention.

While a single strength wire 224 is illustrated in FIGS. 21 and 22, it is contemplated that a plurality of strength wires 224 may be wrapped around the optic fiber 128. In other words, the optic fiber wire 222 may include more than one strength wire 224 without departing from the scope of the present invention.

It is also contemplated that the strength fibers 132 may be eliminated altogether, leaving only the strength wire 224 to provide structural support for the optic fiber wire 222 and, thereby, the fiber optic net 14.

Figure 23:
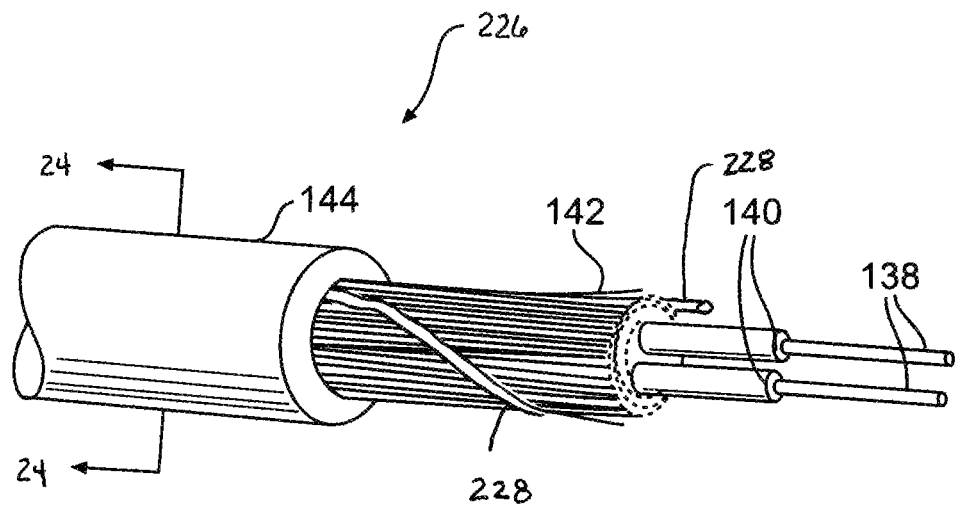
FIG. 23 is a perspective illustration of a fourth contemplated embodiment for the construction of the optic fiber wire forming the optic fiber net that is incorporated into the marine barrier system of the present invention.
Figure 24:
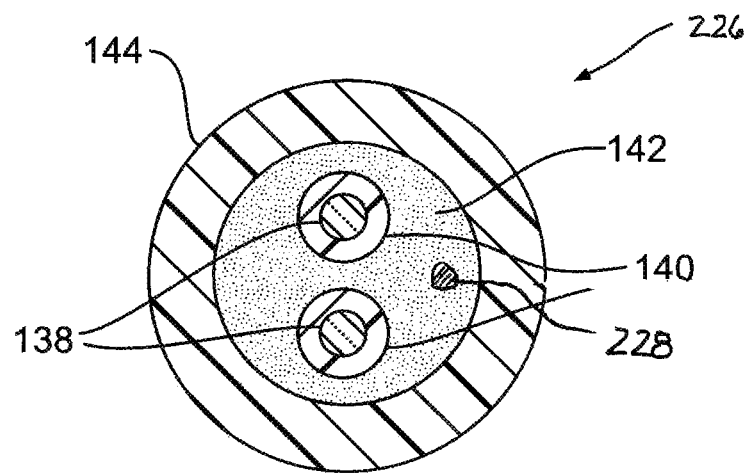
FIG. 24 is a cross-sectional illustration of the optic fiber wire shown in FIG. 23.

FIGS. 23 and 24 illustrate a fourth contemplated of the optic fiber wire 226 of the present invention. The optic fiber wire 226 is a variation of the optic fiber wire 136 illustrated in FIGS. 11 and 12. Here, a strength wire 228 is embedded in the strength fibers 142. In this embodiment, as with the optic fiber wire 136, the optic fiber wire 226 includes two optic fibers 138, each of which are encased in jackets 140. The two optic fibers 138 are surrounded by strength fibers 142. The assembly is encased in an outer jacket 144.

In this fourth embodiment of the optic fiber wire 226, the strength wire 228 is contemplated to possess the same compositional and structural details as the strength wire 224 discussed above with respect to the third embodiment of the optic fiber wire 222. As a result, the details of the strength wire 228 (with all of its variations) are not repeated here.

As is apparent from the illustration, FIG. 23 is a perspective view of the optic fiber wire 226. FIG. 24 is a cross-sectional view of the optic fiber wire 226, taken along the line 24-24 in FIG. 23.

Figure 25:
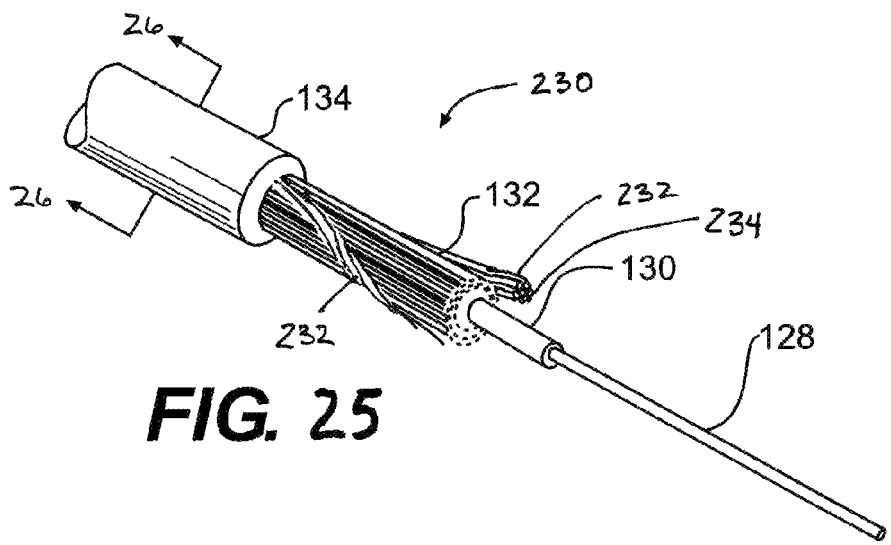
FIG. 25 is a perspective illustration showing a fifth contemplated embodiment for the construction of the optic fiber wire forming the optic fiber net that is incorporated into the marine barrier system of the present invention.
Figure 26:
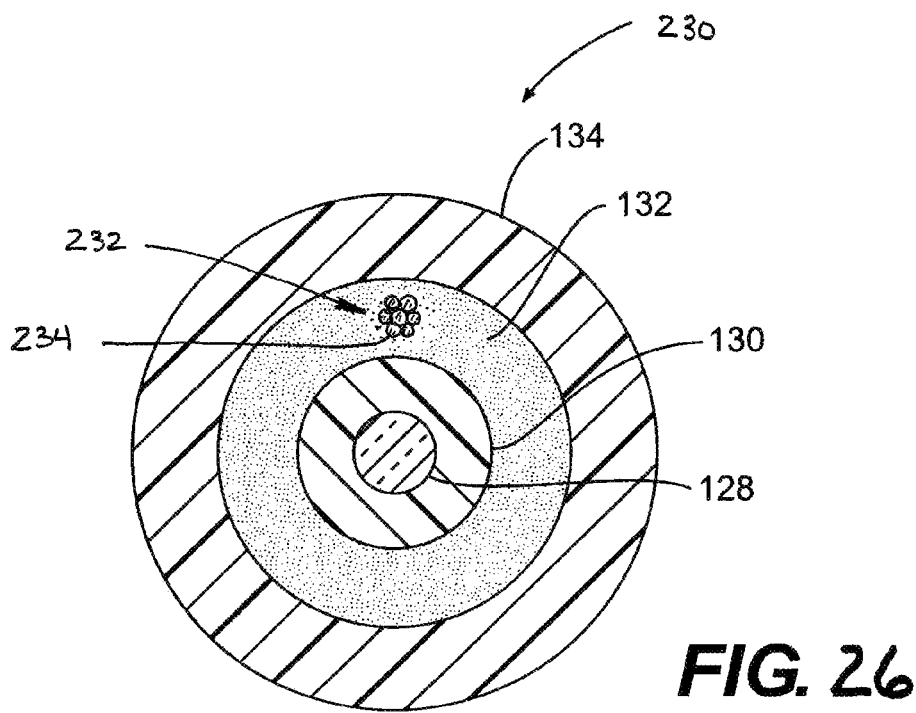
FIG. 26 is a cross-sectional illustration of the optic fiber wire shown in FIG. 25.

FIGS. 25 and 26 illustrate a fifth embodiment of the optic fiber wire 230 of the present invention. This embodiment is a variation of the optic fiber wire 126 illustrated in FIGS. 9 and 10. As a result, this embodiment includes an optic fiber 128 surrounded by a jacket 130. The jacket 130 is surrounded by a plurality of strength fibers 132, such as Kevlar® fibers. The strength fibers 132 are surrounded by an outer jacket 134.

In this fifth embodiment of the optic fiber wire 230, a strength cable 232 is wound within the strength fibers 132, exterior to the jacket 130. The strength cable 232 includes seven stranded strength wires 234.

As should be apparent from the illustrations, FIG. 25 provides a perspective view of the optic fiber wire 230. FIG. 26 is a cross-section of the optic fiber wire 230, taken along the line 26-26 in FIG. 25.

The strength cable 232 is intended to provide a variation on the strength wire 224 illustrated in connection with the optic fiber wire 222 shown in FIGS. 21 and 22. Here, instead of having one or more strength wires 224 wrapped around the jacket 130, the strength wires 234 are wound around each other and, together, are wrapped around the jacket 130.

While seven strength wires 234 are wound together to form the strength cable 232, it is contemplated that a larger or smaller number of strength wires 234 may be employed without departing from the scope of the present invention. For this embodiment, it is contemplated that there will be at least two strength wires 234 wound together. As should be apparent to those skilled in the art, depending upon the cross-sectional dimensions of the individual strength wires 234, a very large number of strength wires 234 may be wound together to form the strength cable 232.

The strength wires 234 are contemplated to have the same compositional and structural characteristics as the strength wire 224 discussed above (with all of the possible variations). Accordingly, the details of the strength wires 234 are not repeated here.

While it is contemplated that all of the strength wires 234 will be the same as one another (i.e., that all of the strength wires will be made from the same metallic or non-metallic material), it is possible that the strength wires 234 may differ compositionally from one another without departing from the scope of the present invention. In addition, while it is contemplated that the individual strength wires 234 will have the same cross-sectional diameters, the individual strength wires 234 may have differing diameters without departing from the scope of the present invention.

In yet another variation of the optic fiber wire 230, multiple strength cables 232 may be wound around the jacket 130. The total number of strength cables 232 is not critical for the present invention. Accordingly, any number may be suitably employed, as should be understood by those skilled in the art.

Figure 27:
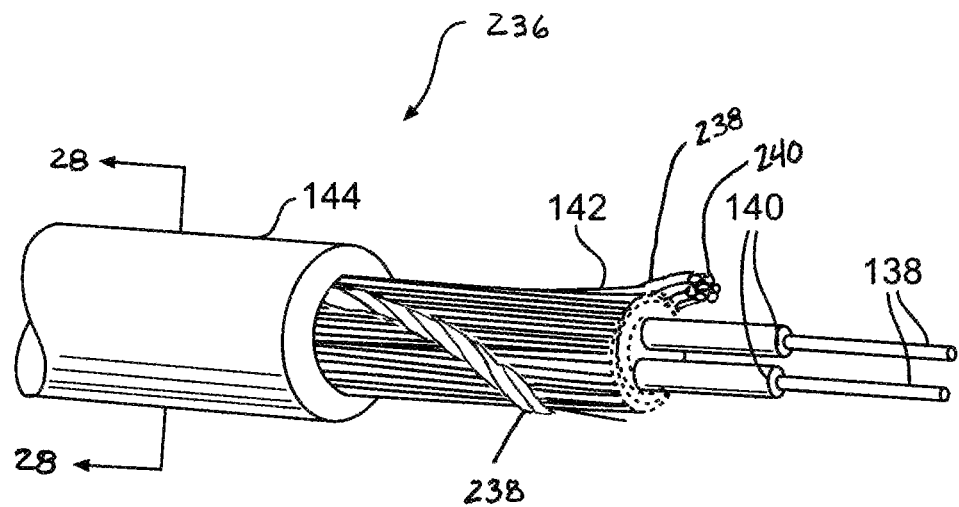
FIG. 27 is a perspective illustration of a sixth contemplated embodiment for the construction of the optic fiber wire forming the optic fiber net that is incorporated into the marine barrier system of the present invention.
Figure 28:
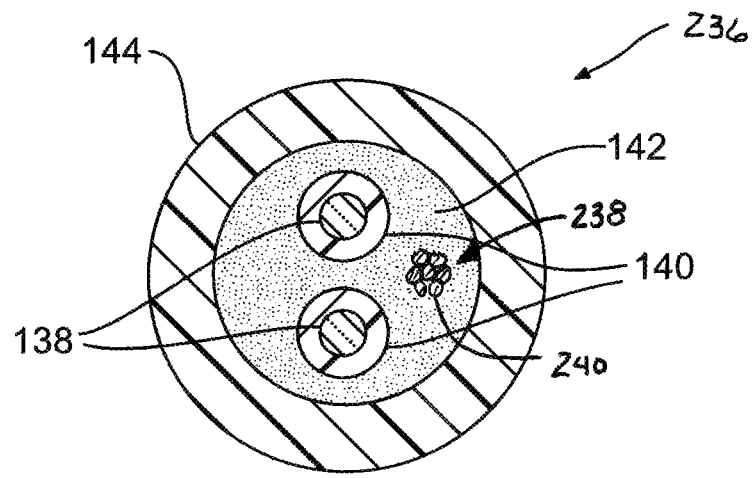
FIG. 28 is a cross-sectional illustration of the optic fiber wire shown in FIG. 27.

FIGS. 27 and 28 illustrate a sixth embodiment of an optic fiber wire 236 according to the present invention. The optic fiber wire 236 is a variation of the second embodiment of the optic fiber wire 136 discussed in connection with FIGS. 11 and 12. As in the prior embodiment, the optic fiber wire 236 includes a strength cable 238 composed of a plurality of strength wires 240. The strength wires 240 wrap around the jackets 140. The strength cable 238 is contemplated to have the same composition and construction as in the prior embodiment illustrated in FIGS. 25-26. Accordingly, the specific details are omitted, for brevity.

Figure 29:
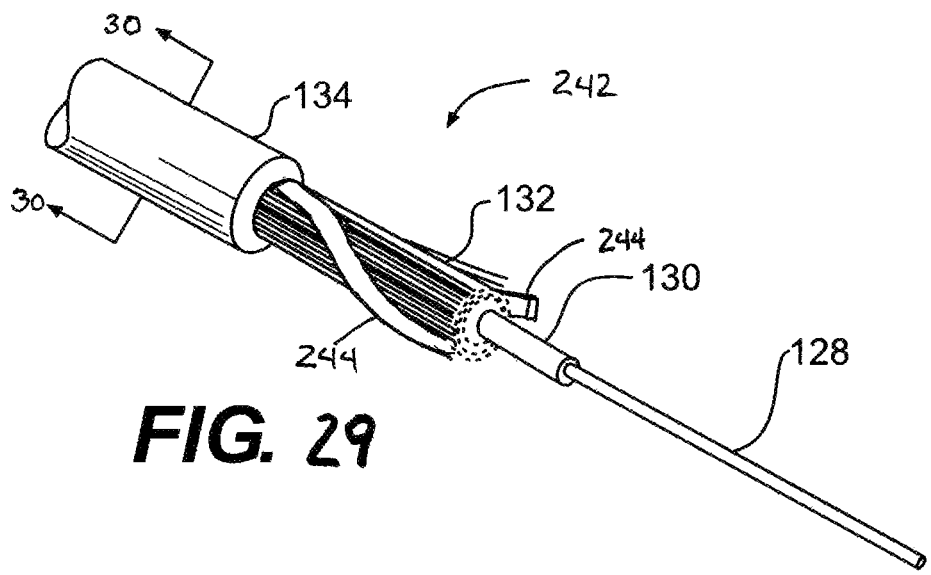
FIG. 29 is a perspective illustration showing a seventh contemplated embodiment for the construction of the optic fiber wire forming the optic fiber net that is incorporated into the marine barrier system of the present invention.
Figure 30:
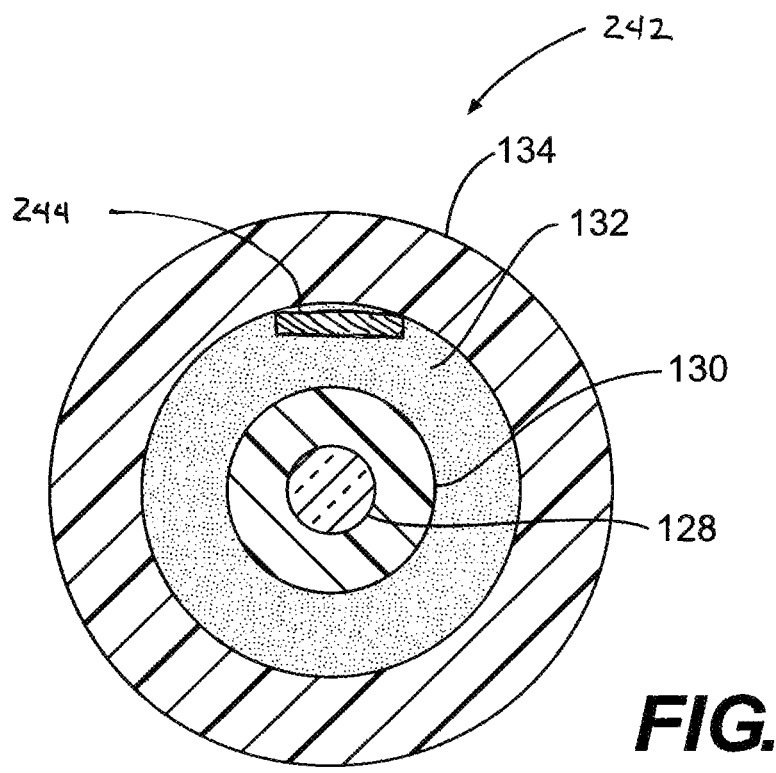
FIG. 30 is a cross-sectional illustration of the optic fiber wire shown in FIG. 29.

FIGS. 29-30 illustrate a seventh embodiment of the optic fiber wire 242 according to the present invention. Here, the optic fiber wire 242 includes a strength band 244 that is wrapped around the jacket 130 within the strength fibers 132. As is apparent, this embodiment is a variation of the embodiment illustrated in FIGS. 9 and 10.

The strength band 244 has a rectangular cross-section. As should be apparent to those skilled in the art, however, the cross-section of the strength band 244 need not be rectangular. It is contemplated, for example, that the cross-section may be arcuate (or curved) to approximate the cross-sectional shape of the optic fiber wire 242.

The strength band 244 may be made from metallic or non-metallic materials as discussed in connection with the strength wire 224, above. Accordingly, the details of the composition of the strength band 244 are not repeated here.

As in prior embodiments, more than one strength band 244 may be incorporated into the optic fiber wire 242.

Figure 31:
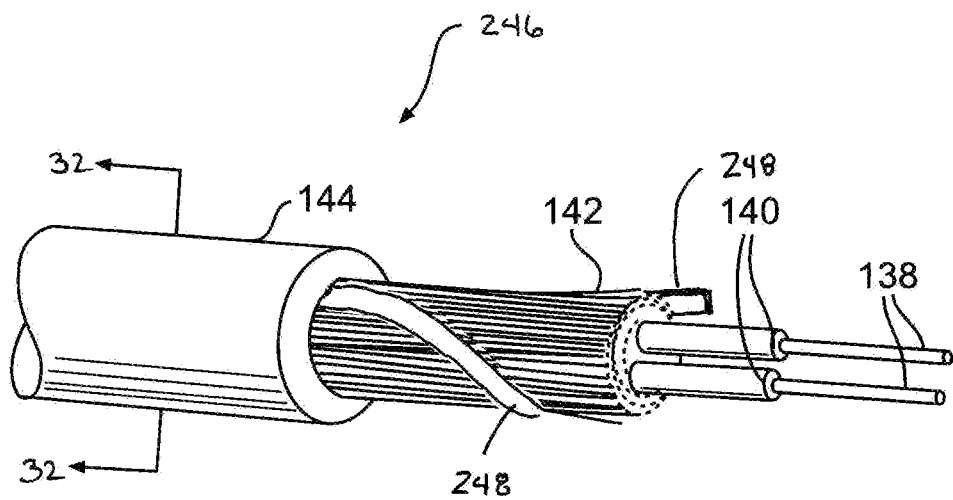
FIG. 31 is a perspective illustration of an eighth contemplated embodiment for the construction of the optic fiber wire forming the optic fiber net that is incorporated into the marine barrier system of the present invention.
Figure 32:
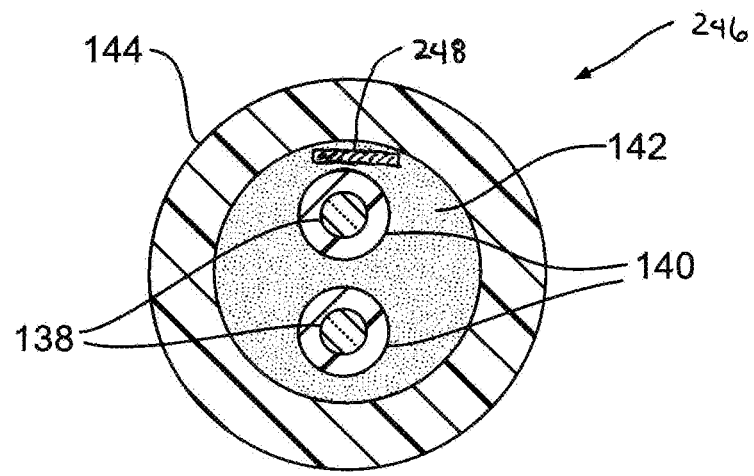
FIG. 32 is a cross-sectional illustration of the optic fiber wire shown in FIG. 21.

FIGS. 31 and 32 illustrate an eighth embodiment of an optic fiber wire 246 according to the present invention. This embodiment is a variation of the embodiment illustrated in FIGS. 11 and 12. In this embodiment, a strength band 248 is wound around the jackets 140. The details of the strength band 248 are contemplated to be the same as discussed in connection with the embodiment illustrated in FIGS. 29-30.

With respect to the strength bands 244, 248, it is contemplated that the thicknesses of the strength bands 244, 248 may be very small. In this contemplated embodiment, the strength bands 244, 248 may present dimensions that would more closely approximate a tape, for example. As such, it is contemplated that the strength bands 244, 248 may be engineered to occupy a small portion of the overall diameters of the optic fiber wires 242, 246.

With respect to the embodiments that include a strength wire 224, 228, a strength cable 232, 238, or a strength band 244, 248, it is contemplated that additional security measures may be employed in connection therewith. For simplicity each of the strength wires 224, 228, the strength cables 232, 238, and the strength bands 244, 248 are referred to hereinafter as "strength members" 250.

The optic fiber wires 222, 230, 236, 242, 246 may be formed into an optic fiber net 252, as discussed above and as illustrated in FIG. 33. In the case where the strength members 250 are made from an electrically conductive material, it is contemplated that the strength members 250 may be connected to an electrical signal generator 254 via a connector 256. The strength member 250 in the optic fiber net 252 may be connected, at its other end, to a signal receiver 258 via a connector 260.

In the embodiment illustrated in FIG. 33, a input signal 262 is generated by the signal generator 254 and is introduced into the strength member 250 that is incorporated into the optic fiber net 252. After passing through the optic fiber net 252, an output signal 264 is provided to the signal receiver 258. By comparing the input signal 262 with the output signal 264, a condition of the optic fiber net 252 may be identified.

The condition of the optic fiber net 252 may be determined via the electrical signals 262, 264 in one or more contemplated ways. If the strength member 250 has been severed, either by a cut in the optic fiber net 252 or via a corrosive degradation of the strength member 250, the loss of signal may be detected from the signal generator 254 to the signal receiver 258. If there has been a break in the outer jacket in the optic fiber wires 222 (for example) that comprise the optic fiber net 252, which has permitted sea water to enter into the optic fiber wire 222 and corrode the strength member 250, the slow degradation of the strength member 250 may be detected due to the degradation of the electrical signal 262, 264.

As should be apparent, the electrical signal 262, 264 in the strength member 250 may cooperate with the optic signal in the optic fiber 128. If the optic fiber 128 passes an optic signal therethrough, but the strength member 250 does not, this may suggest that the optic fiber wire 222 has a leak and that the strength member 250 has failed. Cooperation between the optic signals and the electrical signals may also be used to detect still further conditions of the optic fiber net 252, as should be appreciated by those skilled in the art.

In connection with the embodiment illustrated in FIG. 33, the processor associated with the monitoring station 120 may be configured to receive the output electrical signal 264 and compare the input electrical signal 262 with the output electrical signal 264. As with the optical signal, the processor 120 may generate an alarm if a difference between the input electrical signal 262 and the output electrical signal 264 exceeds a predetermined alarm threshold.

Returning to FIGS. 9-12 and 21-32, several alternative dimensional particulars are considered for these embodiments. Specifically, the optic fiber wires 126, 136, 222, 226, 230, 236, 242, 246 may have overall diameters of about 4.4 mm. More specifically, it is contemplated that the optic fiber wires 126, 136, 222, 226, 230, 236, 242, 246 may have a cross-sectional diameter between 4.0 and 4.6 mm, with an optional tolerance of ±0.23 mm. In addition, the tight buffer or jacket 130, 140 may have a thickness of 900±50 µm. Finally, the green polyurethane jacket 134, 144 may have a thickness of about 1.37 mm.

Other parameters of the optic fiber wires 126, 136, 222, 226, 230, 236, 242, 246 include the following. The crush resistance is anticipated to be about 1000 N/cm. The optic fiber wires 126, 136, 222, 226, 230, 236, 242, 246 may have an impact resistance whereby they are able to withstand about 1000 impacts of 0.75 N·m. The optic fiber wires 126, 136, 222, 226, 230, 236, 242, 246 are anticipated to withstand a flexure of 10,000 cycles/minute. The maximum bend radius of the optic fiber wires 126, 136, 222, 226, 230, 236, 242, 246 is anticipated to be about 15× of the overall cross-sectional diameter thereof. The optic fiber wires 126, 136, 222, 226, 230, 236, 242, 246 are anticipated to withstand short term loadings of about 225 lbs (1000 N). The operating temperature of the optic fiber wires 126, 136, 222, 226, 230, 236, 242, 246 is anticipated to fall within a range of −40° C. to +70° C. Other parameters of the optic fiber wires 126, 136, 222, 226, 230, 236, 242, 246 should be apparent to those skilled in the art, based on the foregoing.

It is noted that concepts and features from one embodiment described above may be employed in other embodiments, as should be appreciated by those skilled in the art. Therefore, the discussion of certain features with respect to one embodiment of the present invention should not be considered to be unique or required only for that particular embodiment.

While the marine barrier and security system 10 of the present invention has been described in connection with specific embodiments thereof, the present invention is not intended to be limited solely to the embodiments described. As will be appreciated by those skilled in the art, elements of the invention may be altered from the specifics discussed above without departing from the scope and spirit of the invention. Moreover, it is intended that all equivalents that will be appreciated by those skilled in the art also fall within the scope of the present invention as discussed above and as recited by the claims appended hereto.

What is claimed is:

1. A fence for establishing a secure marine perimeter, comprising: an optic fiber net, wherein the optic fiber net includes at least one optic fiber wire, the optic fiber wire having an input end and an output end, wherein the optic fiber wire comprises
    an optic fiber,
    a first jacket cladding the optic fiber,
    a plurality of strength fibers surrounding the first jacket, the plurality of strength fibers comprising a water swellable material,
    a strength member, wrapped around the first jacket, the strength member enhancing at least a tensile strength of the optic fiber net, and
    a second jacket surrounding the optic fiber, the first jacket, the plurality of strength fibers, and the strength member;
    a light transmitter connected to the input end to introduce an input optic signal into the optic fiber wire;
    a light receiver connected to the output end to receive an output optic signal from the optic fiber wire;
    an electrical transmitter connected to an input end of the strength member to introduce an input electrical signal into the strength member; and
    an electrical receiver connected to an output end of the strength member to receive an output electrical signal from the strength member; and
    a processor connected at least to the light receiver to generate a first output signal based at least on the output optic signal, to compare the output optic signal with the input optic signal, and to generate a first alarm if a difference between the input optic signal and the output optic signal exceeds a first predetermined alarm threshold,
    wherein the processor also generates a second output signal based at least on the output electrical signal, compares the output electrical signal with the input electrical signal, and generates a second alarm if a difference between the input electrical signal and the output electrical signal exceeds a second predetermined alarm threshold.

2. The fence of claim 1, wherein the strength member comprises a metallic material.

3. The fence of claim 2, wherein the metallic material is selected from a group comprising steel, stainless steel, iron alloys, copper, copper alloys, titanium, titanium alloys, aluminum, and aluminum alloys.

4. The fence of claim 1, wherein the strength member is a non-metallic material.

5. The fence of claim 4, wherein the non-metallic material is selected from a group comprising carbon fibers, aramid fibers, nylons, polyimides, and polyesters.

6. The fence of claim 1, wherein the strength member is a single wire.

7. The fence of claim 1, wherein the strength member is a cable comprising a plurality of individual wires.

8. The fence of claim 7, wherein the plurality of individual wires are stranded together.

9. The fence of claim 1, wherein the strength member is band-shaped, having a rectangular cross-section.

10. The fence of claim 9, wherein the strength member is a tape.

11. The fence of claim 1, wherein the optic fiber comprises a plurality of optic fibers.

12. The fence of claim 1, wherein the light transmitter generates at least one of coherent light or patterned light.

13. The fence of claim 12, wherein the processor generates the first alarm if at least one of the output optic signal is not received by the light receiver or the patterned light deviates beyond a predetermined threshold.

14. The fence of claim 1, wherein the optic fiber net comprises a plurality of panels that are connected to one another to form the optic fiber net.

15. The fence of claim 1, wherein the strength member is embedded within the strength fibers.

16. The fence of claim 1, wherein the strength fibers comprise an aramid.

* * * * *